United States Patent [19]

Burke et al.

[11] Patent Number: 4,636,791

[45] Date of Patent: Jan. 13, 1987

[54] DATA SIGNALLING SYSTEM

[75] Inventors: Timothy M. Burke, Fort Worth; Scott W. Noble, Bedford, both of Tex.; Thomas A. Freeburg, Arlington Heights; Jay R. Krebs, Crystal Lake, both of Ill.

[73] Assignee: Motorola, Inc., Schaumburg, Ill.

[21] Appl. No.: 836,898

[22] Filed: Mar. 6, 1986

Related U.S. Application Data

[62] Division of Ser. No. 402,682, Jul. 28, 1982, Pat. No. 4,590,473.

[51] Int. Cl.[4] ............................ H04Q 9/00; H04B 7/00
[52] U.S. Cl. ............................ 340/825.52; 340/825.44; 455/38
[58] Field of Search ...................... 340/825.52, 825.44, 340/825.47; 455/38, 54, 56, 33; 375/113

[56] References Cited

U.S. PATENT DOCUMENTS

| 4,012,597 | 3/1977 | Lynk, Jr. et al. | 455/54 |
| 4,027,243 | 5/1977 | Stackhouse et al. | 455/54 |
| 4,152,647 | 8/1979 | Gladden et al. | 455/54 |
| 4,369,443 | 1/1983 | Giallanza et al. | 340/825.47 |
| 4,383,257 | 5/1983 | Giallanza et al. | 455/38 |
| 4,427,980 | 1/1984 | Fennel et al. | 340/825.44 |
| 4,430,742 | 2/1984 | Milleker et al. | 455/54 |
| 4,434,461 | 2/1984 | Puhl | 455/33 |
| 4,449,248 | 5/1984 | Leslie et al. | 455/38 |
| 4,477,809 | 10/1984 | Bose | 455/54 |

Primary Examiner—Donald J. Yusko
Attorney, Agent, or Firm—Rolland R. Hackbart

[57] ABSTRACT

A data signalling system for transmitting signals between at least one primary station and a plurality of secondary stations. The system is well adapted for use in multiple unit radio communications systems capable of noise and data communications. A register model is utilized which permits a highly flexible signalling system compatable with a wide range of communications networks. Data transfer is accomplished using fixed length data packets which are error correction encoded and transmitted utilizing PSK modulation.

9 Claims, 28 Drawing Figures

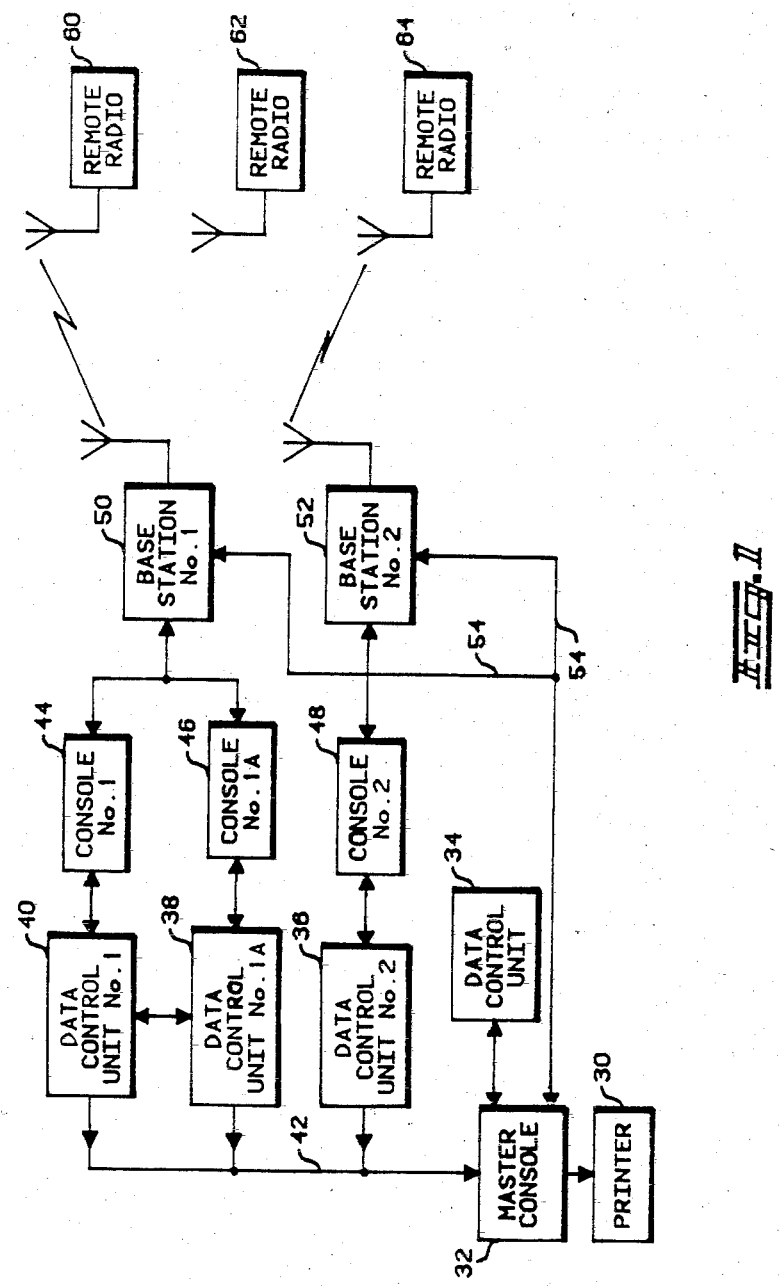

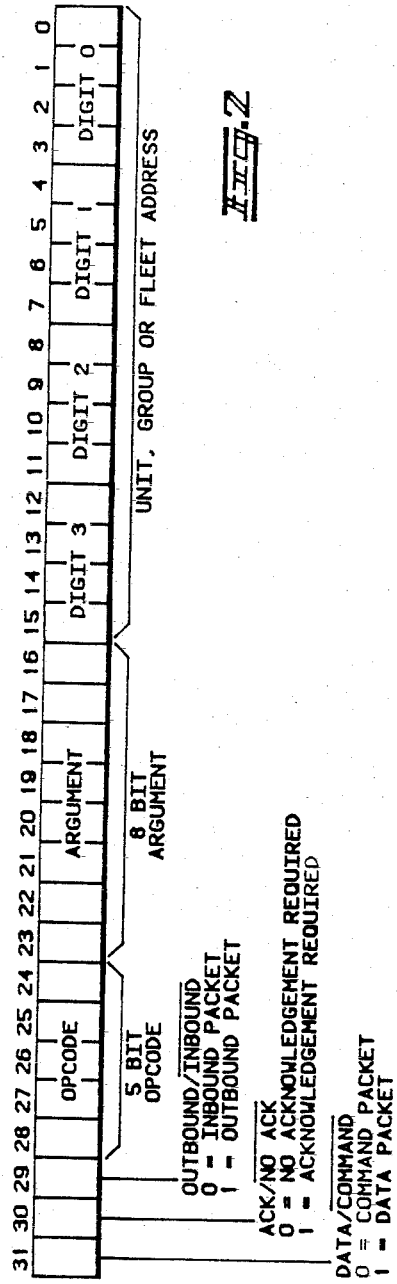
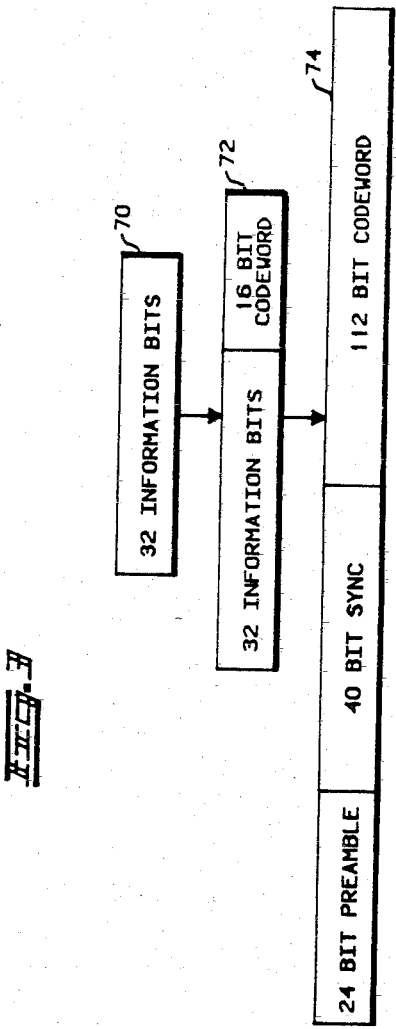

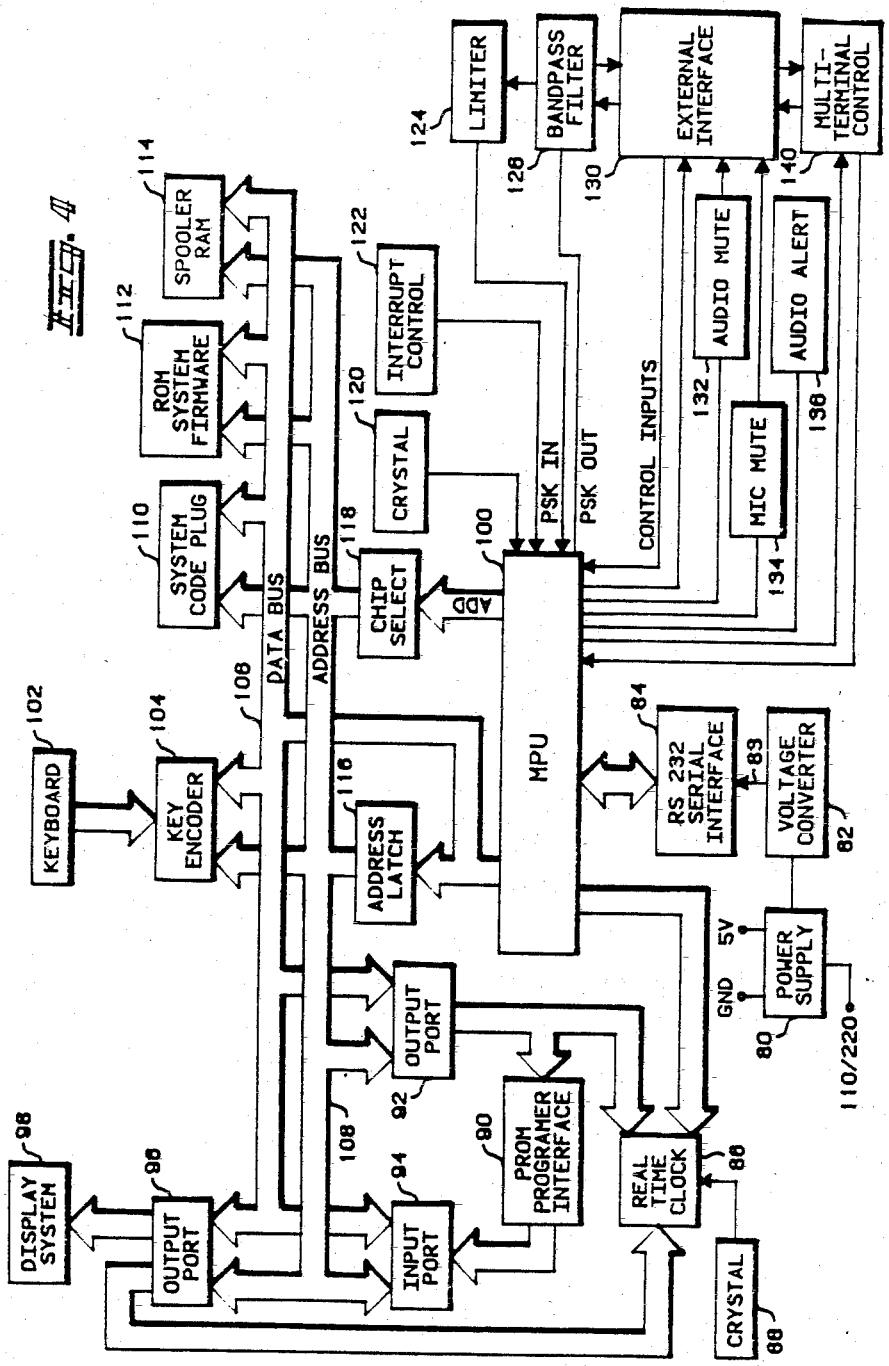

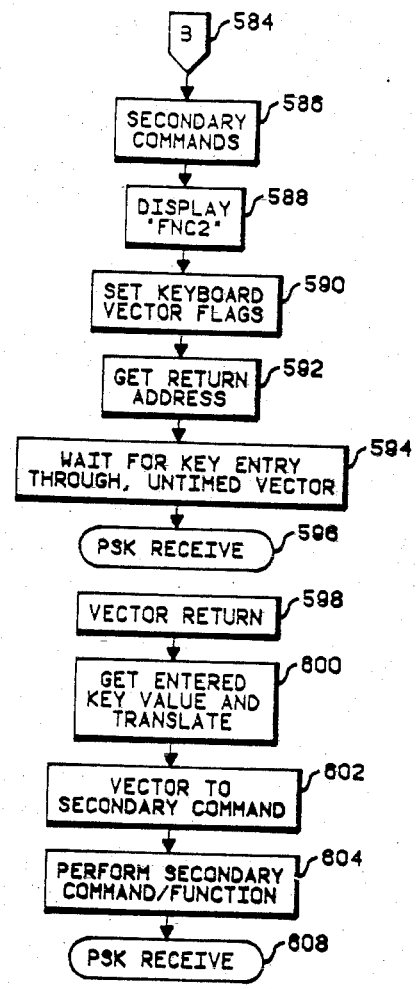

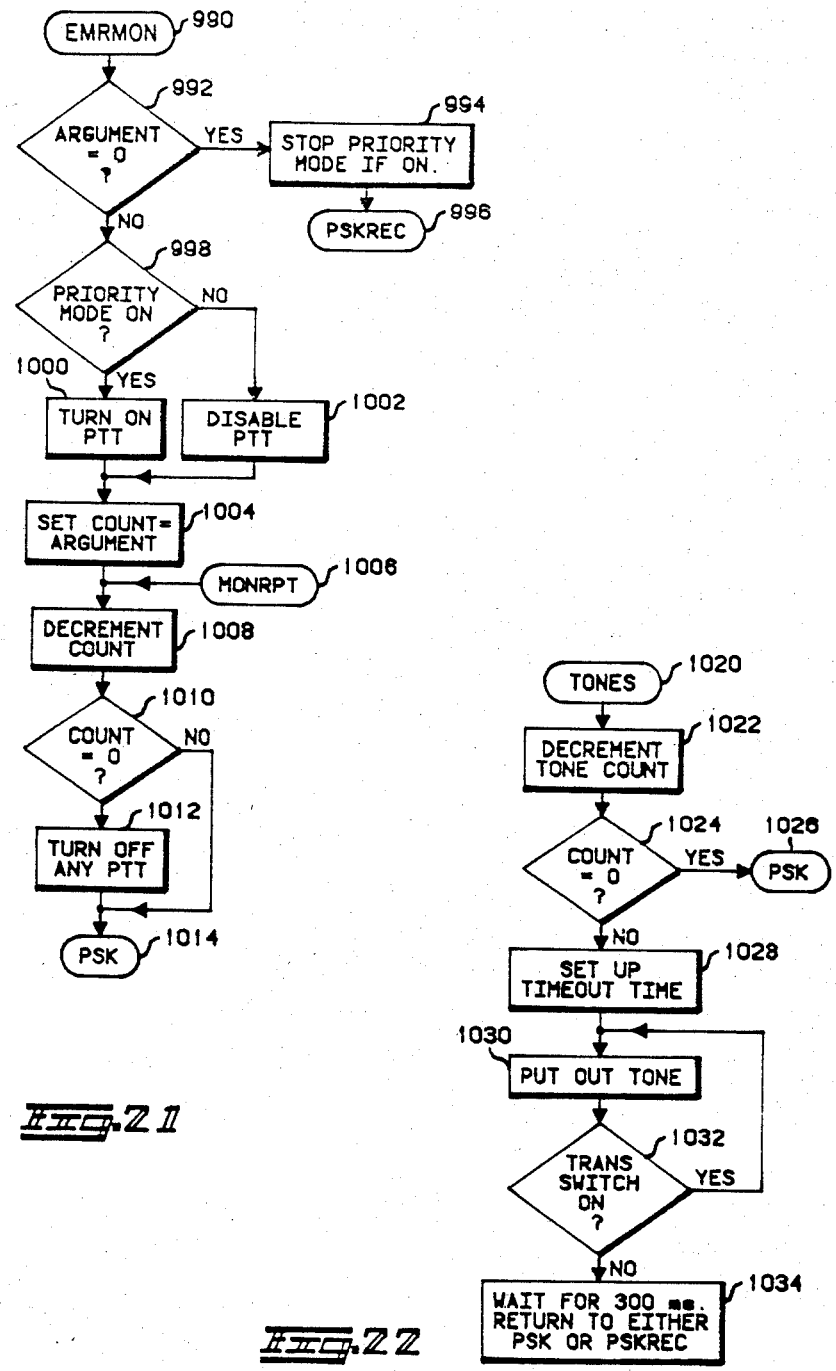

DATA SIGNALLING SYSTEM

This is a division of application Ser. No. 402,682 filed July 28, 1982 now U.S. Pat. No. 4,590,473.

BACKGROUND OF THE INVENTION

1. Field of the Invention

This invention relates generally to data communication systems and in particular to an improved data signalling system particularly well adapted for use in multiple unit radio communication systems capable of voice and data communications.

2. Description of the Prior Art

In the prior art, multiple unit radio communications systems utilize complex signalling systems to provide both voice and data communications capability. Some provide one way status indication capability and acknowledge but with very inflexible formats which limit usefulness. In addition, existing systems utilize structures which are very expensive to manufacture and provide for limited sensitivity in most RF environments. Further, previous systems have been organized around a coding structure that viewed the terminal device as one which responded to a set of discrete commands. The terminal was designed to perform some arbitrary set of operations when a defined command code activated it. This resulted in an inflexible system.

SUMMARY OF THE INVENTION

It is an object of the invention, therefore, to provide an improved data signalling system particularly well adapted for transfer of data over an audio channel of a multiple unit radio communications system.

It is another object of the invention to provide an improved data signalling system which permits dynamic changes in the groups of selectively addressed units as well as organization of the groups.

It is yet another object of the invention to provide an improved data signalling system which utilizes a register model structure to permit a highly flexible signalling system compatible with a wide range of communications systems.

It is still another object of the invention to provide an improved signalling system which has high sensitivity characteristics in most RF environments.

Briefly, according to the invention, a method is provided for transmitting signals between at least one primary station and a plurality of secondary stations by way of a communications medium. The method provides that a central station generates a command signal comprised of an operation code portion, argument portion and address portion and that the central station transmit the message on the communications medium to the secondary stations. Each of the secondary stations receive the command signal from the communications medium and compare the address portion in the received command signal to a predetermined address. The secondary station also decodes the operation code portion in the received command signal if the address portion is found to be substantially identical to the predetermined address when compared, and then executes the decoded operation code portion.

A method is provided for transmitting signals between at least one primary station and a plurality of secondary stations by way of a communications medium. The method comprises the steps of: the central station generating a command signal comprised of an operation code portion, argument portion and address portion; and serially transmitting the command signal on the communications medium to the secondary stations; each of the secondary stations: receiving the command signal from the communications medium; comparing the address portion in the received command signal to a predetermined address; decoding the operation code portion in the received command signal if the address portion is found to be substantially identical to the predetermined address by the comparing step; and executing the decoded operation code portion.

The preceding method is enhanced wherein the transmitting step further comprises modulating a carrier with the command signal before transmitting and wherein the receiving step further comprises demodulating the received signal.

A secondary station is provided for serially receiving command signals from at least one primary station by way of a communications medium, the command signals including an operation code portion, an argument portion and an address portion. The secondary station comprises:

means for serially receiving a command signal from the communications medium;

first register means for storing a predetermined address;

second and third register means for storing signals therein;

processing means for comparing the address portion in the received command signal to the predetermined address stored in the first register means and decoding the operation code portion in the received command signal if the address portion in the received command signal is substantially identical to the predetermined address stored in the first register means, the processing means is responsive to the decoded operation code portion in the received command signal for storing the argument portion in the received command signal in one of the second and third register means.

A secondary station is provided for receiving command signals from at least one primary station by way of a communications medium, the command signals including an operation code, an argument and a station address. The secondary station comprises:

means for receiving a command signal from the communications medium;

first register means for storing a predetermined station address;

second register means for storing a variable station address;

processing means for detecting when a pre-selected address digit in the station address in the received command signal has a predetermined value and comparing the station address portion in the received command signal to the predetermined address stored in the first register means when said pre-selected address digit has the predetermined value and comparing the station address in the received command signal to the variable station address stored in the second register means when the pre-selected address digit has the predetermined value, and decoding the operation code in the received command signal and executing the decoded operation code when the compared dresses are the same.

BRIEF DESCRIPTION OF THE DRAWINGS

The features of the present invention which are believed to be novel are set forth with particularity in the appended claims. The invention, together with further object and advantages thereof, may best be understood by reference to the following description when taken in conjunction with the accompanying drawings.

FIG. 1 is a block diagram of a multiple unit radio communications system utilizing the present invention.

FIG. 2 is a diagram of the preferred data packet structure according to the invention.

FIG. 3 is a diagram of the preferred encoded data packet structure according to the invention.

FIG. 4 is a block diagram of a novel base unit data communications controller that may advantageously utilize the invention.

FIGS. 10A, 10B and 10C form a flow diagram of the COMMAND routine of the base unit computer program for the invention.

FIG. 16 is a flow diagram of the START routine of the mobile unit computer program for the invention.

FIG. 21 is a flow diagram of the EMRMON routine of the mobile unit computer program for the invention.

FIG. 22 is a flow diagram of the TONES routine of the mobile unit computer program for the invention.

BRIEF DESCRIPTION OF THE PREFERRED EMBODIMENT

Figure 5:
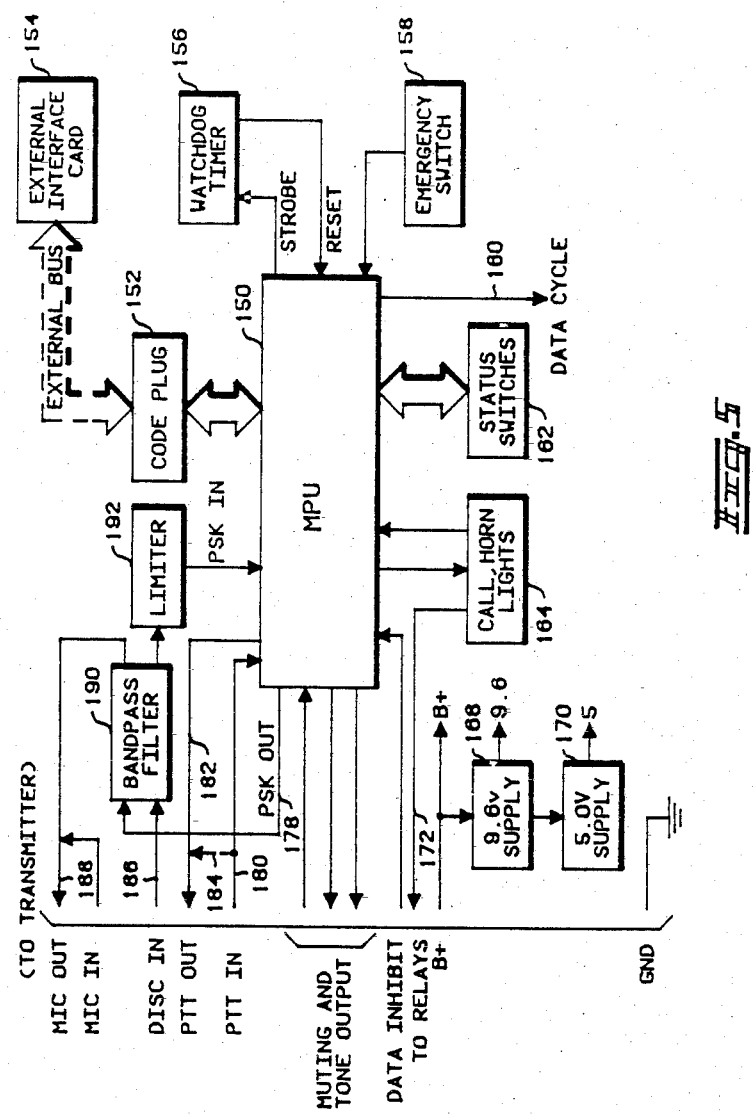
FIG. 5 is a block diagram of a novel mobile unit control circuit that may advantageously utilize the present invention in conjunction with the base data communications controller of FIG. 4.

In FIG. 1, is illustrated the preferred embodiment of a multiple unit radio communications systems that communicates both data signals and voice signals between dispatchers at primary stations 50, 52, (i.e., base stations) and secondary radios (i.e., mobile in the preferred embodiment) which may utilize the inventive signalling system. The radio system illustrated provides enhancement to normal voice RF systems but the invention is not limited to RF systems. The system is processor based such that all the control operations and signalling are performed in software, allowing a portable and modular system that is flexible, reliable, and inexpensive to manufacture.

As illustrated by the preferred embodiment of FIG. 1, the system configuration is highly flexible. Each station includes a dispatcher control console 44, 46, 48 and a base data controller 40, 38, 36 and 34, each having a 12 key keyboard and a four digit display (not shown). A base data controller 40, 38, 36, 34 is coupled to each console unit 44, 46, 48, 32, as shown. Data and voice signals are coupled from the console 44, 46, 48, 32 to a base station 50, 52 by wire lines. The base stations 50, 52 each include a radio transmitter and receiver for communications via a radio frequency (RF) channel to remote (mobile) radios 60, 62 and 64. The mobile radio 60, 62 and 64 may be any suitable conventional radio such as an FM radio in combination with a mobile data control unit (not shown) according to the invention.

Voice communications with the mobile radios 60, 62, 64 is established by means of the dispatcher console 44, 46, 48, 32 while data communications are established by means of the base data controllers 40, 38, 36, 34. Received data signals can be displayed on the four digit display of the base controller. Data signals transmitted by the base data controllers 40, 38, 36 and 32 may be entered from the keyboard or may be automatically generated as, for example, in the case of automatic acknowledgement signals.

The base data control unit may be utilized in numerous configurations. As shown, data controller 40 is coupled to the second data controller 38, which are individually coupled to a dispatcher console 44 and dispatch console 46, respectively. The consoles 44, 46 are both coupled as shown, to the base station 50. Thus, several base data controllers can function in configuration with several console units using a single base station. An alternative configuration is shown with the data controller 36 coupled to a single console 48 which is coupled to a base station 42. All three data control units are coupled via a bus 12, as shown, to a master console 32 permitting each base data controller and base station to be monitored with the master console 32 and a base data controller 34 coupled thereto. A conventional printer 30 is provided to permit logging of any of the data information desired.

The radio communications system in FIG. 1 is particularly well adapted for dispatch type applications, where a dispatcher at a base station communicates with operators of a fleet of mobile radios. In such dispatch radio communications systems, there may be one or more RF channels that are shared by several hundred mobile radios. Therefore, it is desirable that some of the communications between the dispatcher at the central station and the operators of the mobile radios be provided by means of data communications so that use of each RF channel is more efficient.

The data signals communicated between the base stations 50 and 52 and the mobile radio 60, 62, 64 include a bit synchronization portion, a synchronization word, and an information word. The bit synchronization portion may consist of a 1, 0 alternating pattern for allowing a receiver to attain clock synchronization. The synchronization word may consist of any suitable correlatable bit pattern. The information word may consist of an address, commands, and/or status information. Coding techniques are used for error correction and detection to provide low falsing rates and high sensitivity. The preferred embodiment of the signalling system utilizes PSK modulation at 600 bits per second with a 1500 Hz carrier using coherent detection. The data transfer is accomplished using a 32 bit data packet, as illustrated in FIG. 2. The 32 bit data packet is encoded to a 176 bit encoded data packet before transmission, as shown in FIG. 3. This encoded data packet includes 24 bits of data modulated to allow for clock recovery synchronization as shown in block 74 of FIG. 3, and consists of alternating ones and zeros. In addition, a 40 bit fixed synchronization code word is appended as shown in block 74 of FIG. 3. The 32 bit data packet is encoded by first generating a 48 bit inner code word by appending a 16 bit cyclical redundancy check code to the 32 bit data packet, as shown at 72 of FIG. 3. This 48 bit inner code word is further encoded using a half rate convolution encoder. This produces a 112 bit coded word. Thus, a 176 bit encoded data packet is generated as illustrated in FIG. 3.

Upon reception, an exact copy of the original 32 bit data packet is extracted from the 176 bit encoded data packet using conventional decoding methods. The structure of the codes insures that the information can be extracted correctly even if some of the encoded data packet has been corrupted by channel disturbances. Bit synchronization is obtained using the 24 bit preamble providing a pattern to permit extraction of bit clock information. The word synchronization is accomplished by continuously comparing the last 40 received synchronization bits with a fixed synchronization code word and when a predetermined number (35 in the preferred embodiment) of the 40 bits match the synchronization code word bits synchronization is detected. Detection of the synchronization word indicates that the 112 bits of the encoded data word follow immediately. The next 112 bits of the encoded data are stored and then decoded. Transmission time for the basic 176 bit encoded data packet is 290 milliseconds in the preferred embodiment.

The general format of the information word (i.e., command data packet) is shown in FIG. 2, which includes a general description of each field. This basic command packet is only one of several formats that can be used, for example, a simple data block is another possible format in which the first 31 bits are free formatted. In the command packet bit 31 (see FIG. 2) is a data command indicator bit used to identify the packet as a command or control format or a free format data packet. If the bit is zero, the packet is considered to be a command or control packet and follows the format of FIG. 2. If the bit is 1, the packet is a free format data packet. Free format data packets are preceded by a "header" packet of the command type identifying the source or destination of the free format packet and containing the proper OP code and format for the packets that follow. Thus, data packets with 31 bits of data may be concatenated for intense information transfer, such as text.

The bit indicated in FIG. 2 as bit 30 is the acknowledge/no acknowledge bit. This bit is used by the destination unit for acknowledgement purposes and is OP code dependent. If the acknowledge/no acknowledge bit is equal to zero, the destination unit will not acknowledge the command, but if the acknowledge/no acknowledge bit is one, the unit should acknowledge unless the OP code indicates a request or interrogation type command. Thus, certain commands transmitted from either the base or the mobile unit of the preferred embodiment are automatically acknowledged by the receiving unit. In addition, in the preferred embodiment, automatic re-transmission is provided for a programmed number of times in situations in which no acknowledge has been received.

The next indicator bit, indcated in FIG. 2 as bit 19, is the outbound/inbound bit (O/I) used to route data packets. If the O/I bit is zero, the data packet is inbound directed and if the O/I bit is a one, the data packet is outbound. Both the mobile and the base units of the preferred embodiment utilize both states of the O/I bit.

The OP code field of the command packet, shown as bits 24 through 28 of FIG. 2, is used to address a specific internal register of the destination address thereby making it possible to specify a particular command or control operation. Any specific set of instructions may be defined up to 64. In the preferred embodiment, there are several command instruction codes defined and several data type codes.

Each command data packet also contains an argument field, indicated in FIG. 2 by bits 16 through 23, used primarily for data transfer. For example, in the preferred embodiment, status, data, or control information is transferred in the argument field. It is also used as a specific command/control operation when combined with the OP code field, so that up to 256 unique commands can be implemented with each OP code.

The remaining 16 bits of the command data packet, bits zero through fifteen in FIG. 2, are the address field of the 32 bit packet. The address field is partitioned into four hexadecimal digits, as shown. This provides up to 65,536 unique addresses, identifying the sending unit for inbound packets, and identifying the destination unit for outbound packets. In the preferred embodiment, ten thousand unique unit identification codes are used permitting the system to be partitioned into ten fleets with up to 100 unique codes per fleet. Each mobile unit is pre-programmed to contain a unique unit, group and fleet identification code.

An outbound wild card mode of addressing permits a flexible method of group, fleet, and all addressing that may be dynamically configured. In this mode, the hexadecimal F is used in any address partition to signify a match or wild card. When encountering a wild card in any of the four hexademical positions, the unit decoder will match that position with the same position of the pre-assigned unit identification address. Thus, for example, an address of 2FFF would be a fleet call to fleet 2, and FFFF would be an all call.

An outbound direct addressing mode permits addressing group and fleets while allowing units to be members of any group or fleet. In this mode, the hexadecimal E is placed in the most significant digit position of the address field (digit 3) and the fleet address is placed in the next digit position (digit 2) followed by a two digit BCD group number to address a group. The hexadecmial F can be placed in the group position to address a fleet and FFFF can be used to address all fleets.

In the preferred embodiment, the base unit has the capability to re-group mobile units at any time such that the group code becomes, in affect, a soft identification number. For example, suppose the dispatcher wishes to have a conversation with a particular group. But, that there is one member of that group he would like to exclude. He may temporarily move that member to another group, proceed with the conversation, and then return the individual to the group. Each mobile unit may default to the fixed preprogrammed group code on power on.

In the preferred embodiment, the argument field is often used for transmission of status information wherein there are two levels of status used. The first level is called operator status, since it is generally associated with the operator of the mobile unit. The second level is called alternate status and requires an optional interface circuit in the mobile unit. Operator status may be initiated from the mobile unit by various methods. A change in a set of status switches may initiate the transmission of status in cases in which the status switches are exclusive and interlocked. Current status is also sent with every voice transmission and priority alert transmission. Each base unit is equipped with status keying, which allows for display and audio selectivity based upon the received status of a mobile unit. The key may be dynamically configured by the base operator so that, for example, the base audio may be selected to unmute for a particular mobile status. The status switches may also represent message transmissions wherein message transmissions use momentary switches to indicate a transient condition while status transmission uses interlock switches to indicate a held condition. The base operator may also interrogate any mobile for circuit operator status.

A total of eight independent operator status bits are available for each mobile unit. Thus permitting a total of 128 operator status states. The alternate status option provides up to 7 bits of independent alternate status which are readable and setable from the base unit.

The system also provides enhanced selective calling and paging, which can be automatic. With this feature, each call to a unit, group or fleet contains a preamble and a postamble code to unmute and remute, respectively. The base operator therefore simply enters an identification code and then talks as normal to the mobile unit which will automatically reset after the conversation. Or a mobile operator may transmit a voice message which will display the unit number on the console where the base operator then simply presses the transmit switch to selectively respond to the calling mobile. This mode of operation is referred to as AUTO SEL CALL. Paging is provided with automatice acknowledge to activate internal and external alarms at the mobile such as light, horns, and tones.

A priority alert capability exists in which the mobile unit can be activated to the priority by an external switch which has priority over any other radio functions. Priority alert will transmit immediately upon activation regardless of activity on the channel and up to twenty data packet retransmissions will occur if the mobile unit does not receive an acknowledge. The base unit will give special treatment to this priority alert transmission. When a priority alert transmission occurs, the current operator status of the initiating unit is forwarded to the base unit automatically. There are, in addition, two possible acknowledge packets that can be used with priority alert. The first is the normal acknowledge which simply handshakes the original unit. The second also handshakes the originating unit, but, in addition, enables the mobile transmitter for a preset period of time permitting the base operator to monitor that unit. This feature is referred to as emergency monitoring. An emergency monitor acknowledge also disables any other mobile units on the channel from voice transmissions for the duration of the preset period.

There are a number of major options and configurations which are possible in the preferred embodiment based on the signalling system described. These options and configurations are selected by means of a PROM code plug which is in both the base and mobile units. Various system parameters are also contained in the code plug.

Referring now to FIG. 4 there is illustrated a preferred embodiment of a base unit data controller. This base unit of FIG. 4 utilizes a microcomputer (MPU) system in conjunction with system firmware and peripheral devices to provide a terminal system for mobile and portable applications. The microcomputer 100 performs all of the necessary control and interface logic as well as all of the signalling functions including modulation and demodulation, encoding and decoding, display control, keyboard handling, printer interfacing and mobile code plug programming.

As shown in FIG. 4, the base unit includes an MPU 100, which in the preferred embodiment, is an eight bit microcomputer (e.g., a Motorola MC6803). Internal to the MPU 100 is a clock utilizing a crystal 120, coupled as shown to the MPU 100, to produce a system clock frequency of 4.9152 megahertz in the preferred embodiment and which is divided internally to yield an MPU frequency of 1.2288 megahertz. A keyboard system is coupled to the MPU 100 consisting of a 12 key keyboard 102 coupled to a key encoder 104 which is coupled, as shown, to the address bus 108 and the data bus 106, as shown. The key encoder 104 includes a storage function and provides interrupts to the processor while including key debouncing circuitry. The system firmware consists of all the software necessary for the system operation which is stored in a read only memory (ROM) 112 which is coupled to the address bus 108 and the data bus 106, as shown. A random access memory (RAM) 114 is coupled to the MPU 100 via the data bus 106 and the address bus 108, as shown, for use as a serial interface buffer and for identification memory. A system code plug 110 is coupled to the MPU 100 via the address bus 108 and the data bus 106 to store system variables and particular operational characteristics and options of individual units. A real time clock 86 together with a crystal 88 is coupled to the output ports 96, 92 and to the input port 94, as shown, primarily to provide time information for logging. Interface circuitry consisting of a PSK bandpass filter 126, a limiter 124, audio muting relay 132, mic muting relay 134, audio alert generator 136, multi-terminal control logic 140 and external interface logic 130 is coupled, as shown, to the MPU 100. Additional interface circuitry is provided by the RS 232 serial interface 84 coupled with voltage converter 82 and power supply 80 to the MPU 100, as shown. A PROM programmer interface 90 is provided to permit programming identification codes of mobile units and is coupled, as shown, to the output port 92 and the input port 94. Also provided is display circuitry 98 which consists of a display controller for seven segment LED displays and eight LED status indicators (not shown). This base unit structure as shown in FIG. 4, provides the capability to directly interface to a wide variety of RF communication systems.

The display system 98 consists of a four digit LED display and eight individual LED indicators. The display is used for data display of all inbound and outbound identification codes including unit, group, and fleet. The display is also used in editing, data entry, code plug programming, status retrieval and setting as well as displaying any inbound data. The display is driven from the microprocessor system and will accommodate multiple controllers for console applications.

The keyboard system is used for data entry, display editing, command entry and execution. Any and all terminal control is accomplished through the keyboard system and the microphone push to talk switch. The keyboard 102 has two basic keyboard entry modes; upper and lower case. The lower case mode is used to enter identification code numbers and command data. The upper case mode is used in command entry and eventual execution. The base operator has complete control of the data system through the keyboard system.

A real time date clock 86 provides time and date to permit display of the time and date of any and all of the transactions that occur on the system. It is primarily used in the logging system but may also be used as a clock or event scheduler. A specific program necessary to define the particular characteristics of each individual system is contained in a PROM code plug, 90. There are many variables related to a particular system which are defined by the data in this code plug. All the key command definitions to be used in the system are defined by the data in the code plug which must be programmed prior to use. The functions defined by code plug data will be discussed in greater detail hereinafter.

Data squelch is provided for the system so as to blank the audio of data transmissions. The data muting function is provided by software in the MPU 100 and by the audio muting relay 132. In addition to data squelch, the audio muting relay 132 is utilized to perform conventional audio muting. The mute and unmute operation may be keyed off a particular status or identification code.

Each base unit is capable of addressing unit ID codes from 0 to 9999. In addition, a shared system can be structured in which the range is from 0 to 999 wherein the most significant digit is used as a fleet identification, thus allowing up to 10 fleets on a signal channel. In systems which use multiple base units to accommodate multiple dispatchers, each base unit can have keyboard programmable upper bound and lower bounds of accessible ID codes and the range of codes may be dynamically allocated. The base operator thus, would not be allowed to access any codes outside of the current range setting, nor will any inbound data be processed outside the range. In addition, audio muting may be used so that a particular operator will only hear transmissions with ID codes within the selected range.

Many multiple unit communication systems have multiple transmitters which are not always co-located. The base unit provides PTT identification at the beginning and/or end of either a voice or a data transmission. The system code plug determines the desired mode and also contains the four digit ID code. Thus, a particular base unit can identify all mobile and base transmissions and the ID code can be used in logging to indicate wich unit received or transmitted data. In systems where multiple units are used on the same RF channel, control is provided by means of code plug data to prevent multiple simultaneous acknowledge transmissions to mobile units. One unit is designated as the master and the remaining units are designated as slaves, such that the master is programmed to transmit all acknowledge data packets. The acknowledged transmissions can also be programmed to be dependent on the keyboard defined unit code bound and status key. The normal mode of operation for base unit commands utilize the automatic acknowledge feature with re-transmissions. However, the system may also be used with one way modes where the base unit is configured by the code plug to transmit commands only once and not to except an acknowledge when the mobile units in the system are set up in the same configuration mode.

The transmission time of a base data packet is approximately 325 milliseconds providing for radio transmitter turn on delays. However, most systems have inherent delays associated with repeaters tone remote and others that must be anticipated before the actual data packet can be transmitted. To allow for these variable delays, the base unit will generate based on the code plug information, transmission delays from 100 to 1500 milliseconds in 100 millisecond increments. The transmitter will send silent carrier during the delay to minimize data noise on the channel and allow easy interfacing into tone remote systems. All mobile and base units in a given system must have the same system delay.

The base unit will display all incoming PTT identification codes and status indications. The status indicators will reflect the current status of the particular unit. The PTT ID transmissions have display priority over any commands in progress. For example, if the base operator is in the process of entering a number and a PTT ID is received, the display will show that ID. The same is true for commands. Any command in progress will be aborted if a PTT ID is received. This mode of operation will only occur if a PTT ID receive option is selected in the code plug. When an ID is received and properly decoded, it is tested against the current bounds. If the code falls within the bounds, the ID will be displayed and put into memory for further processing and sent to the logging system for printout.

A priority alert transmission mode is provided which has absolute priority over any terminal transactions. The base unit will display the unit code of the mobile generating the alert. The display will flash the ID code and any status indications as well as sound an audio tone. To clear the system of a priority code the base operator must press the clear switch. Priority alert may be stacked in a LIFO memory and recalled by a recall command so that multiple priority alerts may occur simultaneously without loss of data. However, if the base unit is currently in the priority mode and a new priority is received, the new priority ID will take over the display. The previous priority may be later recalled from memory. Even though a priority alert will lock out the display from any further use, data packets can still be received and acknowledged. All data will also continue to be sent to the logging system.

The base unit can also include an emergency monitor feature which is code plug selectable. When a priorty alert packet is received, the base unit will go immediately into a priority mode and acknowledge the mobile unit and terminate any retransmission sequence. The base operator may then activate an emergency monitor sequence which will transmit a data packet to the mobile unit which enables the radio transmitter for ten seconds. At the end of the ten seconds, the mobile will send another priority alert packet. The base will continue to send an acknowledge packet which will enable the transmitter. The cycle will continue until the operator at the base clears the emergency monitor feature with the clear key. Thus, the base operator can voice monitor the activity of the mobile unit in the priority mode.

The base unit is capable of storing up to 64 mobile initiated inbound data packets. Whenever inbound data packets are received and properly decoded, the unit code and status information is placed in the memory. The method of storage is last in, first out, (LIFO) which is essentially a stacking operation. As a new ID is received, it is placed at the top of the stack and the ID codes currently in the memory are pushed down the stack. The operator may use a recall key to advance the stack pointer and display the next entry. A clear key is used to position the pointer at the stack top which displays the most recent ID and status. This feature is provided as a review mechanism in situations where several data packets are received in quick succession to enable the operator to keep track of all unit numbers.

The base unit also provides memory capability to queue up operator status packets as they arrive in time, up to 128 operator status data packets. The method of storage is essentially a queuing operation of first in, first out (FIFO). If there are any data packets in the queue, the operator may display the next ID code and status and remove the previous display. One of eight status indicators is used to show an active or inactive queue. If the queue is active the operator may also, by pressing a clear key, display the first packet in the queue. In addition, a status queue control allows the terminal operator to enable or disable entries to the queue. Only operator status packets are queued. PTT ID transmissions and priority alerts will be displayed when they occur but will not affect operation of the queue. If the queue is disabled, any received operator status packets will be immediately displayed or if the terminal contains a LIFO stack, it will be placed on the LIFO stack. If the queue control is enabled, an operator status packet will be queued without affecting terminal operations including the display. However, a short beep will be heard to inform the operator of an arriving status.

Polling of a limited number of mobile units for operator status and alternate status is provided by the base unit. This feature allows the operator to scan the system and produce a status list of a select group of mobile units. The operator may also select a particular status by entering a beginning unit number from the keyboard and then initiating the poll and entering a unique status where the poll is to stop. The poll will start at the entering number and sequentially interrogate the mobile units for status. Each time the status packet is received, the unit will perform a match operation and if a match exists the poll will stop. If there is no match, however, the poll will continue until the upper ID limit is reached or the poll count, which is preprogrammed to a desired value, such as ten, is depleted.

All of the base units are equipped with control logic to prevent simultaneous channel access by multiple units connected in parallel. The same logic is used to inhibit inbound transmissions when the RF channel is busy. Each unit has a busy output and an inhibit input which are normally connected together, forming a single coupled to the external interface 130, that becomes both a sense and a control line. Before any commands are executed by the unit, the inhibit line is tested for activity. If the line is clear, the command is transmitted and the unit asserts a high level on the busy line indicating use of the channel. The line will remain busy until an acknowledge is received or the retransmission cycle is complete. If the channel is busy at the command time, the unit will wait until a line becomes clear and hold will be displayed indicating to the operator that the line is busy. When the inhibit line clears, the unit will not transmit immediately. Each terminal in a multi terminal system contains a priority number from 0 to 254 in its code plug. This number is used to generate a delay proportional to the priority number. The terminal will wait out this delay and then re-sample the inhibit line. If the line is still busy, the wait process will continue until access can be obtained. A random packet delay cycle is also used in the delay process if a simple data command is being performed. If the line is clear, the unit transmits as described above. The inhibit input line may be connected to the busy output line because each unit knows if it is busy or not. Thus, a simple twisted pair is all that is needed to connect multiple terminals. Another feature involving multiple terminals in the same channel relates to command overlap. Each and every command that is executed by a particular unit will affect only that unit. If a unit interrogates a particular mobile unit for status, for example, the status packet that the mobile returns will be displayed on that unit only and will not affect other units on the channel. This feature allows independent control by multiple operators but only applies to outbound commands. Any inbound data such as operator status and priority alert will be displayed on all terminals on that channel. This may be defeated by using the status matching technique or dynamic range selection discussed hereinabove or by simply defeating the particular receiver function via the code plug.

A mode of selective voice calling (AUTO SEL CALL) is available on all base units selectable by coding the code plug. This feature allows for simple dispatching in a selective manner. The operator enters the desired ID code, the system will wait for the microphone PTT switch to be depressed. When it is, an unmute data packet will be transmitted signalling the selected mobile units to unmute their receiver audio. When the PTT switch is released, a mute data packet is sent. During this period of selective voice calling (AUTO SEL CALL) transmission, the base unit display will read CALL, indicating to the operator that a SEL CALL is being made. By means of the keyboard, the AUTO SEL CALL mode may be enabled or disabled. If disabled, no selective call will be made when the microphone PTT switch is depressed. The logging system can record both SEL CALL and normal voice transmissions. If a mobile unit makes a voice transmission to the base, the unit ID code will be displayed on the base unit. The base operator may simply press the microphone PTT switch and talk. No other key entries are necessary and the mobile unit will be selectively called.

Each time a command transmission is performed by the base operator, the receiving mobile unit may send an acknowledge packet. If the decoded data packets are correct indicating that the handshake is successful, the base unit will display an acknowledge indication that the mobile received the command. If the command happens to be an interrogation for data, such as operator status, and the handshake is successful, then the display will show the received data and no acknowledge will be displayed. If the handshake was not completed on the first transmission, the unit will automatically retransmit the command in a random fashion for a number of times determined by the code plug unless an acknowledge packet is received within this interval. An acknowledge will terminate the sequence. If no acknowledge is received after the total number of transmissions allowed have occured, the display will show a fail indication and the operator may re-initiate the command. The base unit code plug can be programmed so that the channel sense is used to automatically monitor the channel before transmissions and re-transmissions. The same inhibit control line is used as that used for multi-terminal control. If the channel is busy, the data is inhibited. However, when the channel clears, a random clock will begin to sample the channel for activity when the clock times out. If the channel is still busy, the random cycle/sample process will continue. However, if the channel is clear, the command data packet will be sent to the mobile unit and an acknowledge will be received.

A closed loop signalling system test can be performed on selected mobile units by all base units. The test performs a series of radio check commands which include mobile acknowledgement. It is normally used at system start up, but may also be used in system diagnostic tests. When the operator enables the test mode, the terminal will prompt the operator for the unit ID code of the mobile to be tested and the number of individual tests to be performed (9,999 maximum). When the test is completed, the display will indicate the number of successful closed loop tests. The logging system will also be used to show all the data relative to each individual series of tests. The results of the test will reflect the statistics of the RF path mobile and base radios, etc. and may be used to correct any system problems.

An optional code plug module is available for the base unit to allow programming of mobile unit, group, and fleet ID codes, selective calling muting modes and system delays. The system delay contained in the base unit code plug is automatically inserted for all mobile units regardless of shared or dedicated configurations. When the module is connected to the base unit, the unit is automatically placed in the program mode. The programmer provides both a read and a program command. If the read command is executed, the terminal will display all relevant data to the operator. Error control is provided to test the ID codes for proper values and inform the operator of an improper code plug. If the program command is executed, the terminal will prompt the operator for the necessary data, attempt to program the code plug and then display the contents. Error control is also provided in the program mode to prevent the programming of invalid codes.

The base unit performs a limited diagnostic test of the hardware, software system on power up. Real time clock, random access memory, code plug, control ports and other various circuits are tested and any errors are reported via the display system and the audio alert. Also, a command key is available to test the four digit display and the eight status indicators.

Referring now to FIG. 5, there is shown a block diagram of a mobile unit control circuit for use in conjunction with a mobile transceiver, that may be advantageously utilized with the present invention. The mobile unit of FIG. 5 consists primarily of a microcomputer 150 (e.g., Motorola MC3870) and associated peripheral circuitry. The processor performs all of the PSK modulation, demodulation, encoding and decoding of the signalling system. It also performs all control logic and management functions of the mobile system.

Incoming data is applied from a receiver detector in analog form to the discriminator input 186. It is then bandpass filtered by bandpass filter 190 to remove unwanted signals and receiver noise. The signal is then limited through the limiter 192 and than processed by the MPU 150. The computer performs coherent detection of the signal resulting in various data packets which provide the command and control information for the unit.

Data to be transmitted is prepared in data packets in the MPU 150 and presented as PSK modulated packets at the output 178. The data packet is then filtered using the same bandpass filter 190 as in the receiving mode to remove undesirable low frequency energy from the PSK data. The signal is than coupled to the microphone output 188 to the radio transmitter. The microphone is muted during data transmissions to prevent any voice interference. All of the transmit control, audio muting, tone generation and channel sensing is performed by the MPU 150. A code plug 152 is coupled as shown to the MPU 150 and contains all of the system information and selected options of the unit. The data in the code plug 152 is read by the processor 150 and then used in the control of operation of the unit. A watchdog timer 156 is coupled to the MPU 150 to monitor a known signal out of the processor and reset the machine in the event of processor failure or transient conditions. An emergency switch, 158, is coupled directly to the MPU 150 as shown as are a set of eight status switches 162. A number of input and output switches and indicators, such as the horn and lights, are coupled to the MPU 150, via the interface circuit 164 and the conductor 172, as shown. A data cycle output 160, a muting input and two tone outputs are also provided, as shown. The mobile unit system also requires a five volt power supply 170 and a 9.6 volt power supply 168.

The unit, group, and fleet ID code of each unit are stored in the code plug, as well as individual system functions such as ID, status, priority alert and select call.

A unique unit identification code is transmitted with every voice transmission and is triggered off the microphone PTT switch which is input to the MPU 150 at input 180 of FIG. 5. The system can be programmed so that the ID is sent at key-up or key-down or both or the ID may also be message oriented where only a single transmission occurs after, for example, the removal of the microphone from the hang-up box. The transmission time of a mobile data packet is approximately 325 milliseconds including the radio transmitter turn on delays. However, to allow for the variable system delays the mobile unit also generates, based on the code plug data, the transmission delay for the system. The PTT ID transmission may also be programmed via the code plug to send start/end status with voice transmissions such that the base unit will provide automatic voice unmuting and muting control, indication of an active transmission and logging of transmission duration.

A very flexible status option can be programmed into the system via the code plug which allows various arrangements of status and message to reside in the system. Two levels of status are available, operator status and alternate status. The alternate status requires an optional external interface card 154 of FIG. 5 which is coupled via an external bus to the code plug 152.

There are three distinct types of operator status available in the mobile unit; new operator status, current operator status and messages. New operator status requires a positive action by the mobile operator. This may be a change in status in which case the operator will physically change a set of switch settings and send off the new status to the base. The mobile unit may have up to nine switches which may be momentary, push push type, interlocked or thumb wheel type switches, depending upon the requirements of the particular system. Current operator status always reflects the most recent setting of the status switches but does not require any action by the mobile operator. The base unit is capable of obtaining the current operator status of any mobile unit without any action by the mobile operator. And, in addition, current status can be automatically transferred to the base on every PTT ID transmission. Messages are status of transient nature. To send a message, the mobile operator must activate a switch and the base unit will automatically display the message each time it is sent. However, the base unit is not capable of obtaining messages from a mobile unit, nor will any messages be sent along with voice transmissions. New operator status and message transmissions may be manually sent with the operator monitoring the received channel before transmission or may be automatically sent with the channel being sensed for traffic before transmit.

Manual status transmissions involve a sequence of simple operations. This type of status is used in systems where channel sensing is impractical or impossible such as in radio systems where no radio signal is available for sensing channel activity. When the mobile operator decides to transmit a status to the base unit he sets the proper status switches and the radio is automatically placed in the monitor mode. He waits for the channel to become clear if it is busy, then presses a momentary send switch at which point the data packet containing the status information will be transmitted immediately and the base unit will acknowledge. Lock out is provided so that multiple sequences will not occur if the send switch is not released.

With automatic status, no channel monitoring by the operator is necessary since the channel is sensed for any ongoing traffic, data or voice. If the channel is busy, the data transmission is inhibited until the channel clears, when a random clock will begin and the channel will be sampled for activity when the clock times out. If the channel is still busy, the random clock cycle will continue. If the channel is clear, the data packet containing the status will be transmitted to the base unit and an acknowledge will be sent back to the mobile unit. This prevents overlap of several units pending transmission. The optional automatic monitor mode can be used in any status configuration. Messages are sent in the same manner as operator status except momentary switches are used.

There are three code plug selectable status/message transmission modes available in the mobile unit; single without acknowledge, single with acknowledge, and multiple with acknowledge. The single without acknowledge mode is intended for one way systems without receiving capabilities. Each time a status or message transmission is initiated by the mobile operator, the data packet is transmitted once and there is no acknowledge transmission by the base unit. This is a global mode applicable to all options in the mobile unit. Thus, if no acknowledge is selected for the status mode, there will be no acknowledge for all data packets. Since there is no acknowledge sent for data transactions there can be no operator feedback of the successive transmission.

The single with acknowledge mode allows for all status and message transmissions to be acknowledged. If the handshake is successful, the mobile unit will produce a short audio tone indicating that the status or message was received at the base. If the handshake was not complete, meaning that the mobile did not receive the acknowledge, a non-acknowledge indicator will flash indicating to the mobile operator a bad transmission sequence and permitting the operator to then re-initiate another sequence. Thus, the mobile operator is given both positive feedback and negative feedback on status and message transmissions.

The multiple with acknowledge mode is identical to the single with acknowledge mode except retransmissions will automatically occur if the initial transmission was unsuccessful. This is an extremely reliable mode of operation. Thus, if an acknowledge from the base unit is not received within a random time interval, the mobile unit will automatically sense and re-transmit the status data packet. This process will continue until an acknowledge is received or a programmed number of retransmissions have occured. As in the single with acknowledge mode a short audio tone will alert the mobile operator of a successful sequence.

There are eight possible status switch inputs for a mobile unit. A common configuration would be a seven button status system where all of the seven status switches are mechanically interlocked. Each time a status change is desired the operator pushes the desired switch which will lock into position and remove and previous setting. The status may be automatically transmitted at that point or be initiated by a ninth switch, the momentary send switch. To send the same status, the operator must use the send switch independent of manual or automatic transmission. Many other configurations are possible including various select call switch combinations with status. The status system is also capable of supporting momentary message switches along with interlocking status switches. The message switch being momentary, will transmit a transient message. If a system involving more than one message switch is needed, the mobile unit can have up to eight unique messages. The message switches are all momentary switches and the send switch is therefore unnecessary. A powerful feature of the mobile unit status system is that each of the status positions are independent.

Another important feature of the status system of the mobile unit of FIG. 5 is the ability of the base unit operator to inform the mobile operator to update his operator status. This is done by the use of a command in the base unit which will cause the non-acknowledge indicator to be activated at the mobile, signalling the mobile operator to update his operator status switches.

Alternate status is a general purpose status function providing an alternative or extension to the operator status. Its operation is different from operator status in that the mobile operator may not initiate an alternate status transmission in the basic system. In a system containing the priority alert option, the priority alert data transmissions will also send the current alternate status.

Since the alternate status is sent along with priority alert, the status may be used as location information, extended priority levels, vehicle switches, etc. In these situations, the alternate status may be initiated by the mobile unit. The alternate status option requires the optional interface 154 of FIG. 5. The mobile code plug is removed from the mobile unit and inserted on the external interface 154. A ribbon cable connector is placed between the code plug socket on the mobile unit and a similar socket on the interface card. The data and address bus of the code plug is than multiplexed with alternate status. Seven parallel inputs and seven independent parallel outputs are provided with the alternate status option.

The base unit may interrogate any mobile unit for alternate status. The base is also capable of setting any combination of mobile alternate status outputs. The seven status inputs may be connected to switches as in operator status thereby providing extended status capability. In a configuration using seven status switches and seven message switches, the message switches are momentary and the status switches are pushbutton type or interlocked. When a message is transmitted, the status is not sent along. Instead, the base operator will manually interrogate the mobile unit or the base unit can be programmed to automatically retrieve the alternative status when a message is received. If the alternate status outputs are used as indicators in the same system, the indicators may be used as base status. If alternate status is used to represent vehicle status, the seven inputs can be connected to sensors in the vehicle, for example, oil pressure, fuel, temperature, etc.

The priority alert option is independent of the other options and may be enabled in any mobile system configuration. The priority alert is normally to be activated by an external switch such as emergency switch 158, FIG. 5. When activated, this normally closed switch will trigger a sequence of special data packet transmissions that have absolute priority over any other mobile unit functions. The initial priority data packet is transmitted immediately regardless of any channel sensing logic. If an acknowledge is not received within a random time interval, the mobile unit will automatically retransmit the priority data packet. A total of 20 transmissions will occur if an acknowledge is not received, in which case the operator may re-initiate another sequence. A sequence of transmissions will terminate immediately upon receiving an acknowledge. For security purposes, the mobile operator is not informed of positive or negative acknowledge. Activation of the Priority alert will lock out all other data functions until an acknowledge is received or the sequence is terminated. When a priority alert is received by the base unit, the display indicating the mobile unit number will flash and an alarm will sound. The base unit will transmit any one of two types of acknowledge packets determined by the programming of the code plug. The first type is a normal acknowledge which terminates the priority sequence in the mobile unit. The second type is an emergency monitor packet which will terminate the priority sequence in the mobile unit and than will key up the radio transmitter for a fixed period of time (in the preferred embodiment, 10 seconds). At the end of this time period the mobile unit will send another priority data packet to the base and then switch to the receive mode. The base unit will continue to send emergency monitor data packets in this cyclical fashion until a clearing operation is performed by the base unit operator. This allows the base operator to voice monitor the activity of the mobile vehicle in the event of a priority alert. The same emergency monitor data packet that is used to enable the transmitter of a mobile unit in the priority alert mode is used to disable all other mobile transmitters in the system equipped with the mobile unit control systems. This feature provides a clear-channel to the unit in the priority mode. In addition, if the mobile unit has operator status, that status will be sent to the base unit along with the priority condition, with the priority packet containing the operator status. If the mobile unit has alternate status, that status is also sent. With this feature, various levels of priority may be established within a system. In addition, the mobile unit will respond to a unique command to initiate a priority alert sequence. This command may be issued by the base unit or by a portable transmitter, thus, allowing remote emergency systems where the mobile is used as a repeater.

A select call option is available with the mobile unit and is totally independent in operation and selection from other features. The purpose of the select call system is to allow private and/or secure voice communications and paging operations. Selective voice calling is accomplished in the mobile unit by muting and unmuting the mobile radio audio. These operations are controlled by various data packets that originate from the mobile and base units. The base unit is capable of supporting several simultaneous modes of voice calling.

An auto select call mode of operation is provided whereby the base unit operator simply enters the unit, group or fleet identification code on the terminal and uses the microphone as normal. The selected unit, group, or fleet of mobile units will automatically unmute the audio for the duration of the voice transmission and then re-mute. The auto sel call mode does not provide acknowledgement due to the fact that the voice follows the unmute data packet while holding the transmitter key. The system is automatic in that the base operator is not required to press a call switch for each transmission.

A basic switch configuration for a select call mobile unit would include a call light used in voice calling and paging to indicate that the base unit has signalled that unit, except in the AUTO SEL CALL mode where the call light would not be affected. A reset switch, which would be a momentary type switch, can be provided to clear the call light and remute the audio if the automatic muting fails. A horn and light switch are provided which are push-push type switches and are used to engage the horn and lights for external alarms. A base group, and fleet switch may be provided to permit encoding capability to the mobile unit and are part of the AUTO SEL CALL mode. The switches are preferably mechanically interlocked. With these three switches, the mobile operator may selectively voice call the base, other members of his current group, or his fleet. If the base switch is selected, all voice transmissions from that unit will be directed to the base unit. The base unit will display the unit identification code as in the PTT ID option and no other mobile units in the system will hear the transmission. If the group switch is selected, all voice transmissions from that unit will be heard only by members of the same group. The base unit will display the group identification code and no other mobile units in the system will hear the transmission. If the fleet switch is selected, all voice transmissions from that unit will be heard by members of the same fleet and the base unit will display the fleet identification code. With the group or fleet switch selected, a voice transmission by the mobile operator will display the group or fleet ID code at the base unit. However, the mobile unit code plug may be programmed so that concatenated data packets are sent at the end of every group or fleet voice transmission to permit the base unit to display the unit code of the transmitting mobile. With this feature programmed into the code plug, the base unit will sequentially display the group or fleet code followed by the unit code. A call with acknowledge mode of voice calling is available to the base unit operator who would enter the unit, group, or fleet identiication code of the units to be called. He then would press a call switch and a responding mobile unit will unmute the radio audio, light the call lamp and activate any external alarms provided, alert the mobile operator with a short audio tone and send an acknowledge packet to the base. No acknowledge packet would be command is issued to a group or a fleet. This mode does not provide automatic remuting of the audio. The mobile operator must manually reset the muting by pressing a reset switch, by coming offhook, or by initiating a voice transmission.

When the select call option of the mobile unit is used in a private line system, there are three major muting modes available: AND, OR, and none. With DPL or PL muting used in the system and the mobile unit in the AND muting mode, both the proper PL or DPL code and the correct identification code must be present to unmute the receiver audio. When the microphone is removed from the hangup box or the monitor operate switch is placed in the monitor position, all muting is disabled. If, however, an individual or group calling is desired from base to mobile without disturbing other mobiles in the system while retaining a PL operation for general mobile to mobile and mobile to base communications, muting may be selected as an OR mode. In the OR mode, the audio will respond to either a select call or a proper PL or DPL code. If the system is to be used for external alarms and call light operation and all units are to hear all transmissions with the proper PL or DPL code, then no muting is selected.

There are two paging modes available to the base operator for which the mobile unit can respond. The first paging mode simply alerts the mobile operator with a series of audio tones, activates any external alarms or enables the call lamp. No audio muting or unmuting is performed. The base operator enters the unit, group, or fleet identification code of the units to be paged. He then presses a page switch and the addressed mobile unit will perform the above action and transmit nonacknowledge back to the base. Group and fleet page operations will not be acknowledged. A second paging mode is identical in operation to the first except that no audio tones will be produced.

All mobile units provide for group reassignment by a base unit operator. The base operator may interrogate any unit for its current goup identification code and may also dynamically change that code. Since the group code may be dynamically altered, the group code may be used in some systems as a variable identification code. Once a mobile unit group ID has been changed, any group addressing of that unit will performed by the new ID number. When a mobile unit is powered up, the group ID contained in the unit code plug is placed in random access memory. The base unit may alter this code in RAM by use of a re-grouping command. The mobile unit will always use the current group code in RAM for group operations.

All mobile units are provided with a "radio check" function. This is activated by the base operator entering the unit ID code of the mobile to be checked followed by a radio check command. The mobile unit will than respond with a normal acknowledge. This feature may be used in system diagnostics or to test the availability of the mobile operator.

A part of the select call feature permits the base unit to selectively enable or disable voice transmission control of mobile units. The base operator may enter the unit group or fleet identification code of the unit to be enabled or disabled. He than executes the disable command and the selected unit or units will be inhibited from further voice transmissions. The command has no effect on data transmissions.

The optional external interface, 154, provides all the logic and interfacing to enable the alternate status feature and data channel selection logic. The data channel selection logic will enable a mobile unit to transmit any and all data on specific designated channels. It does this by way of the frequency selection switch of the mobile control head. An audio alert mechanism is provided to alert the operator of an invalid channel selection if any data transmissions are initiated on an invalid channel. The logic may be capable of automatically reverting to a selected data channel.

Figure 6:
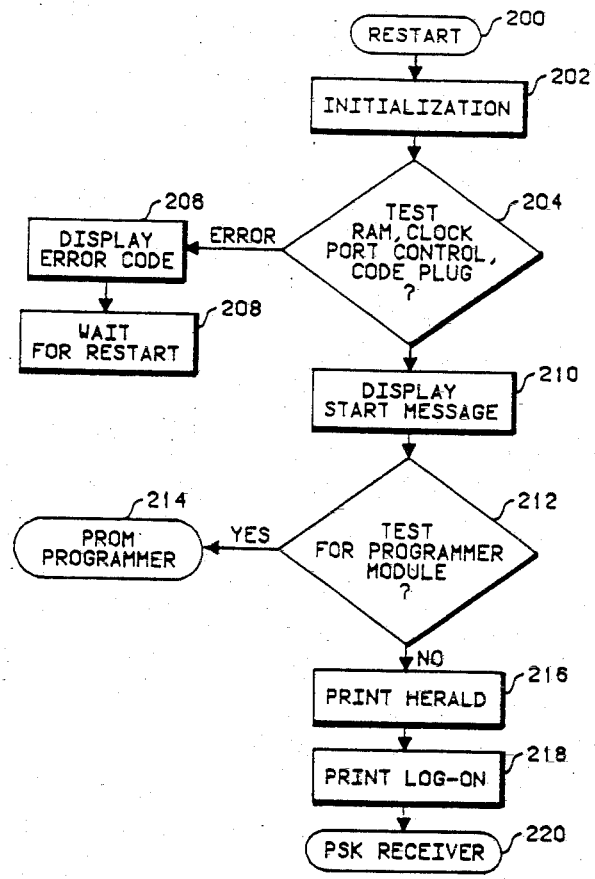
FIG. 6 is a flow diagram of the RESTART routine of the base unit computer program for the invention.

FIG. 6 is a flow diagram of the RESTART routine of the base unit computer program for the microcomputer 100 of FIG. 4 for implementing the invention. The program is entered at block 200 upon power up and initialization occurs as illustrated at 202. The RAM, clock, ports, and code plug are tested at 204 and if an error is detected, an error code is displayed, as illustrated at 206, after which the system waits for restart to be initiated by the operator as indicated at 208. If no error is detected, the routine continues instead to block 210 displaying a start message on the display 98 and proceeds to 212 to test for the presence of the programmer module. If the programmer module option exists the program flow proceeds to block 214 and then to the PROM PROGRAMMER HANDLER routine. If no PROM programmer option exists, then the routine proceeds to blocks 216 and 218 to activate the printer to print a predetermined herald and log on information. The routine then transfers control to the PSK RECEIVE routine.

Figure 7:
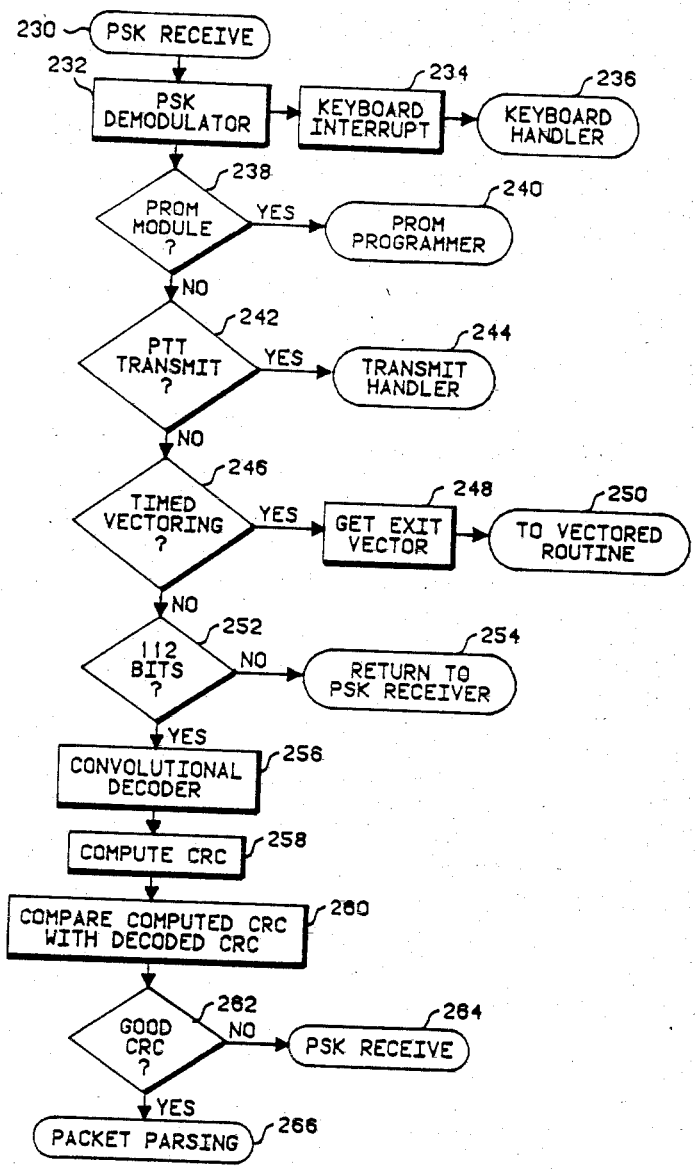
FIG. 7 is a flow diagram of the PSK RECEIVE routine of the base unit computer program for the invention.

A flow diagram of the PSK RECEIVE routine is shown in FIG. 7, which shows entry to the routine at block 230. The PSK demodulator is immediately entered at 232. The PSK demodulator is a separate routine for demodulation and detection of the PSK modulated signal such as that described in a co-pending application filed by Timothy Burke and Scott Noble on Dec. 7, 1981, bearing Ser. No. 328,332 and assigned to Motorola Inc. If a keyboard interrupt is generated, the program flow proceeds as indicated at block 234 to the KEYBOARD HANDLER routine shown at 236. Otherwise, the routine will proceed to block 238 to test for the existence of the PROM module which, if present, causes the program flow to proceed to block 240 to the PROM programmer. If not, the program flow proceeds to block 242 to test the push-to-talk (PTT) transmit switch. If the push-to-talk transmit switch is activated, the program flow proceeds to the TRANSMIT HANDLER routine as indicated at 244 and if not activated, program flow proceeds to block 246 to test timed vectoring. If the result of the test at 246 is positive, program flow proceeds to block 248 to get the exit vector and then to 250 to the vectored routine, otherwise, program flow will proceed, as shown, to block 252 to determine whether there has been a 112 bits detected, indicating a complete data packet. If there are not 112 bits program flow will proceed to block 254 and return to the PSK RECEIVE at block 230. If the 112 bits have been detected, program flow proceeds to block 256 to the convolutional decoder for decoding of the 112 bit encoded signal and then to block 258 where the cyclic redundancy check code is computed and to 260 where the computed CRC is compared with the detected CRC. If the results of the CRC check is negative, then program flow proceeds from block 262 to 264 to the beginning of the PSK RECEIVE routine at 230. If the CRC check is positive, the program flow proceeds as shown at 266 to the PACKET PARSING routine.

Figure 8A:
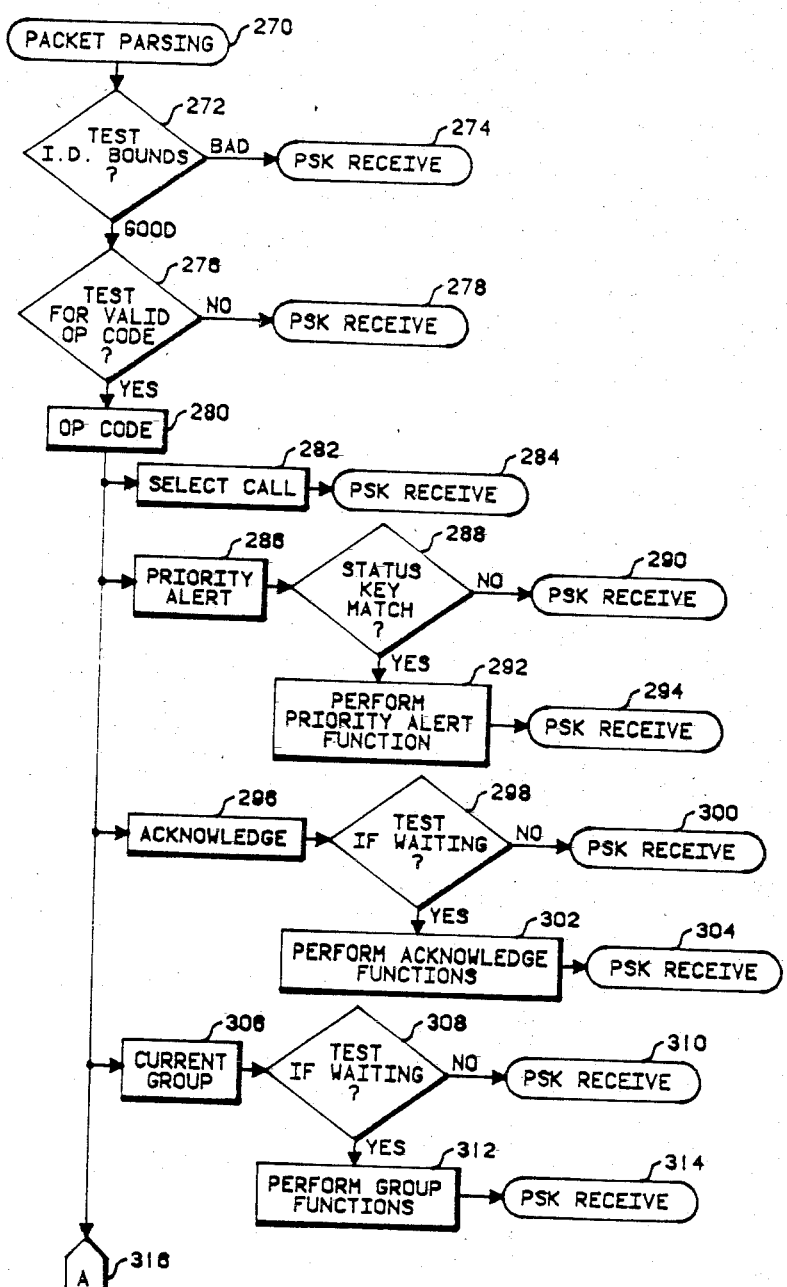
FIGS. 8A and 8B form a flow diagram of the PACKET PARSING routine of the base unit computer program for the invention.
Figure 8B:
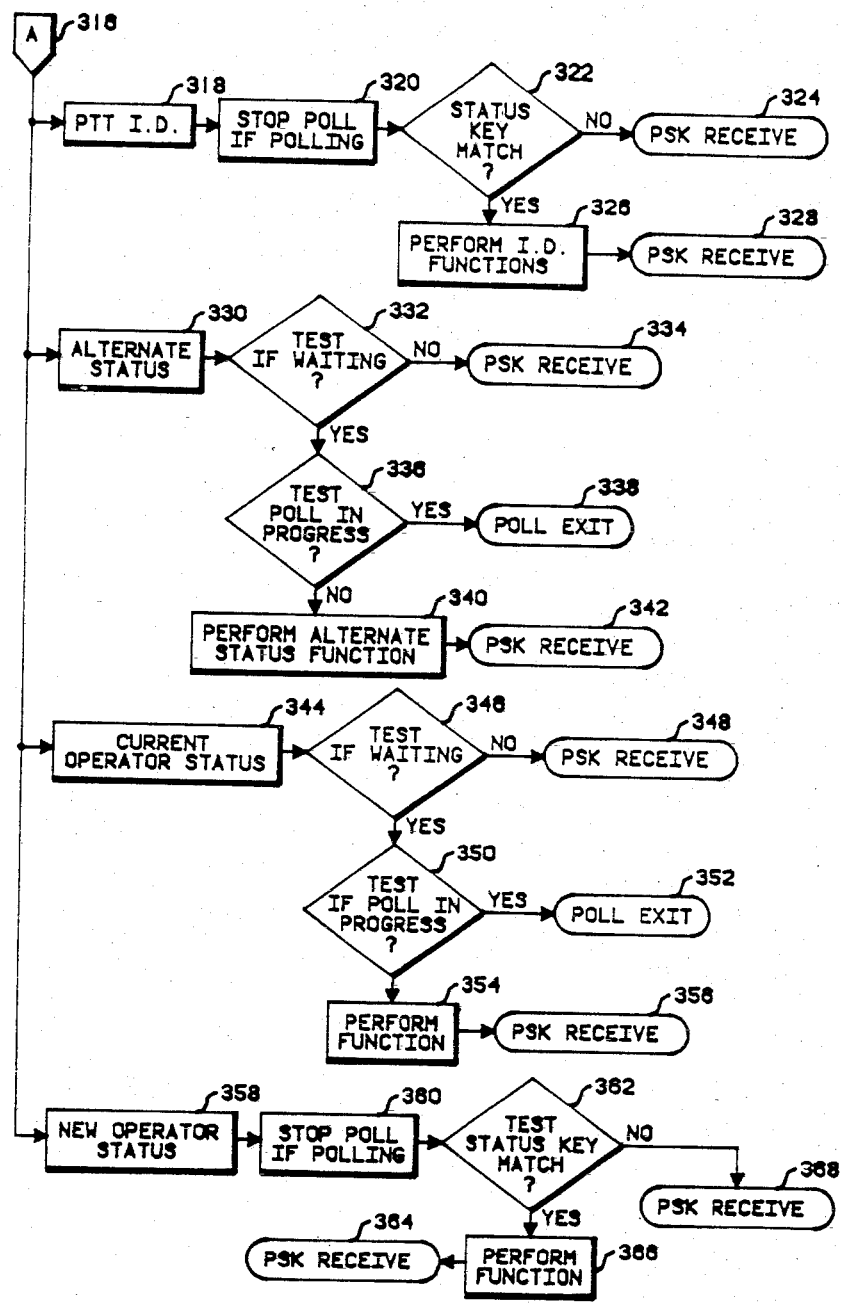

The PACKET PARSING routine is entered at block 270 of FIG. 8A and program flow proceeds to block 272 to test the bounds of the ID address. If the address is outside of the bounds, then program flow proceeds, as shown, at 274 back to the PSK RECEIVE routine. However, if the ID address is within the predetermined bounds stored in memory, then program flow will proceed to block 276 where the program will test for a valid operational code (OP code) and if the code is not valid, the routine will return to the PSK RECEIVE routine as indicated at 278. If the operational code is valid, than the program proceeds to block 280 where the program will proceed to the proper mode as determined by the operational code. If the OP code addresses a select call mode the program flow proceeds to block 282 and then, as indicated at 284, the program is transferred to the PSK RECEIVE routine. If a priority alert mode is addressed by the OP code then the program will proceed to block 286 where the priority alert function is activated and as indicated at 288, the status key match test is performed. If there is not a match of the status key, then the program proceeds to the PSK RECEIVE routine as indicated at 290 and if the status key matches, then as indicated in 292, the priority alert function is performed and the routine than proceeds to transfer control back to the PSK RECEIVE routine as indicated at 294. An acknowledge OP code will cause the program to proceed to block 296 for execution of the acknowledge function. Program flow will proceed to 298 where the program will test to determine if it is waiting for an acknowledge and if not, then the routine immediately proceeds to transfer to the PSK RECEIVE routine as indicated at 300, however, if it is waiting for an acknowledge then the program proceeds to block 302. At block 302 acknowledge functions are performed and control in the transferred to the PSK RECEIVE routine as indicated at 304. A current group OP code will cause program flow to proceed to 306 and as indicated at 308 a test for waiting is again performed and if no wait, than program flow is transferred directly the PSK RECEIVE routine as indicated at 310. Otherwise, program flow proceeds to block 312 which perorms the group functions and then transfers control to the PSK RECEIVE routine as indicated at 314. The PACKET PARSING routine continues from FIG. 8A to FIG. 8B at 316. FIG. 8B, indicates at 318 that if a PTT ID function is addressed by the OP code than program flow will proceed from 318 to 320 to stop polling if polling is occuring and then to block 322 to test the status key for a match. If no match exists, the program flow proceeds immediately to the PSK RECEIVE routine as indicated at 324 and if a match occurs, then at 326 the ID functions are performed and then the program transfers to the PSK RECEIVE routine as indicated at 328. If an alternate status function is addressed by the OP code, then the program proceeds to block 330 and then to 332 to test if the program is waiting and if no waiting is occuring, than the program proceeds directly to the PSK RECEIVE routine as indicated at 334 and otherwise proceeds to block 336 to test if a poll is in progress. If a poll is in progress, then the program proceeds to the POLL EXIT routine as indicated at 338 and otherwise proceeds to block 340 to perform the alternate status function and from that point the program control is transferred to the PSK RECEIVE routine as indicated at 342. If the OP code addresses a current operator status function, program flow proceeds directly to block 344 and from there to block 346 to test to determine if the program is waiting. If no waiting is occuring then the program proceeds to the PSK RECEIVE routine as indicated at 348 and otherwise proceeds to block 350 to test to determine if a poll is in progress. If a poll is in progress, the program flow is transferred to the POLL EXIT routine as indicated at 352 and otherwise proceeds to block 354 to perform the current operator status function and then transfers program control back to the PSK RECEIVE routine as indicated at 356. Finally, an OP code calling for a new operator status function (or message) will transfer control directly to block 358 and then to block 360 where the poll is stopped, if polling is occuring. Program flow then proceeds to block 362 where the status key is tested for a match. If there is no status match, then program flow is transferred to the PSK RECEIVE routine as indicated at 368 and if a match occurs, then the new operator status function is performed as indicated at 366 after which the program control is transferred to the PSK RECEIVE routine as indicated at 364.

Figure 9A:
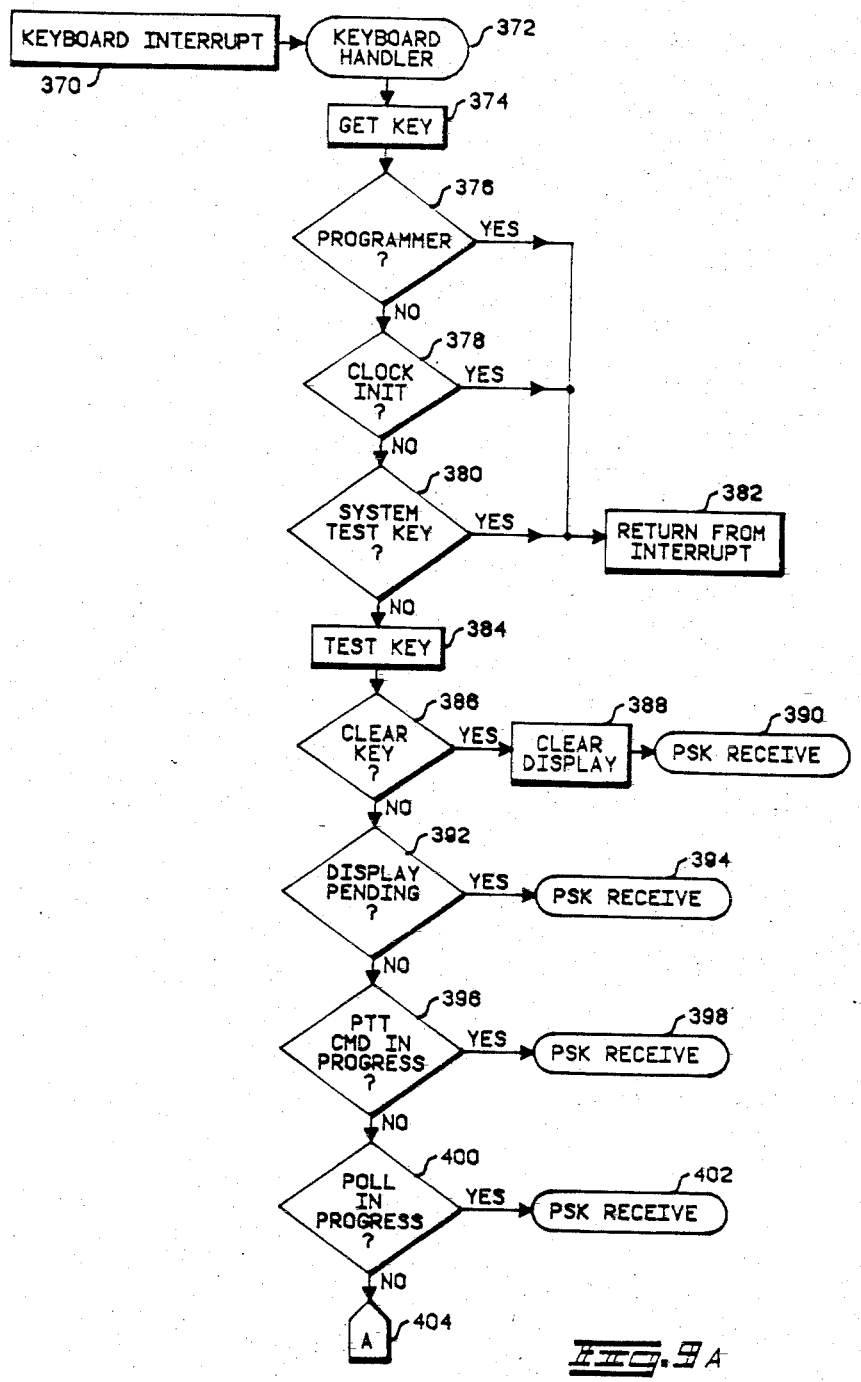
FIGS. 9A, 9B and 9C form a flow diagram of the KEYBOARD HANDLER routine of the base unit computer program for the invention.
Figure 9B:
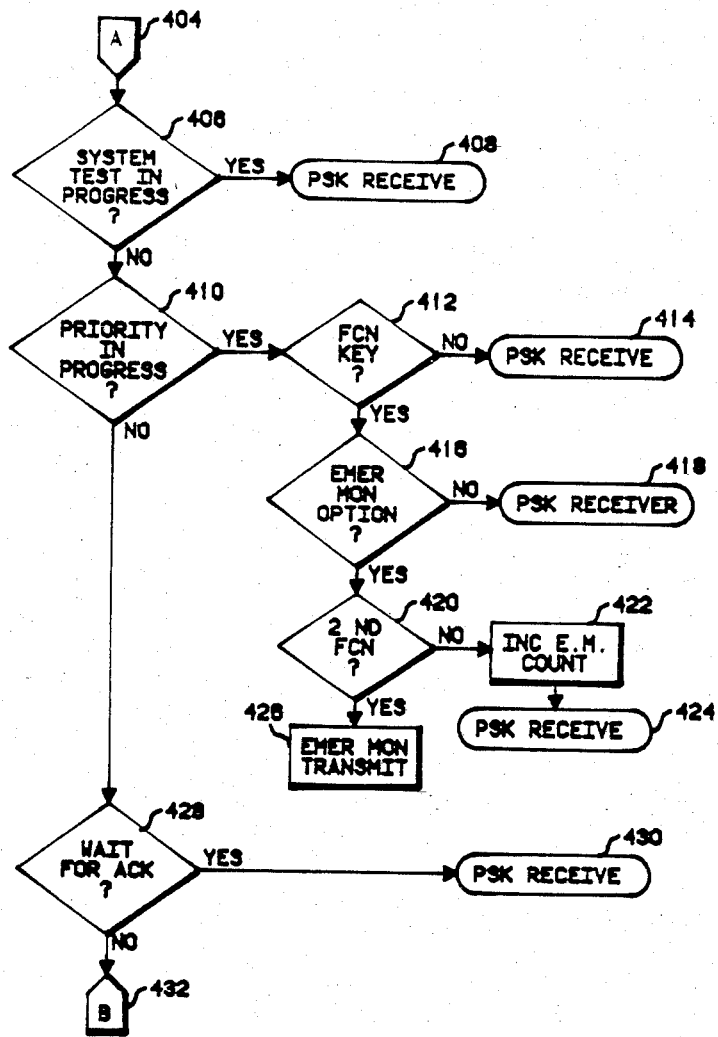
Figure 9C:
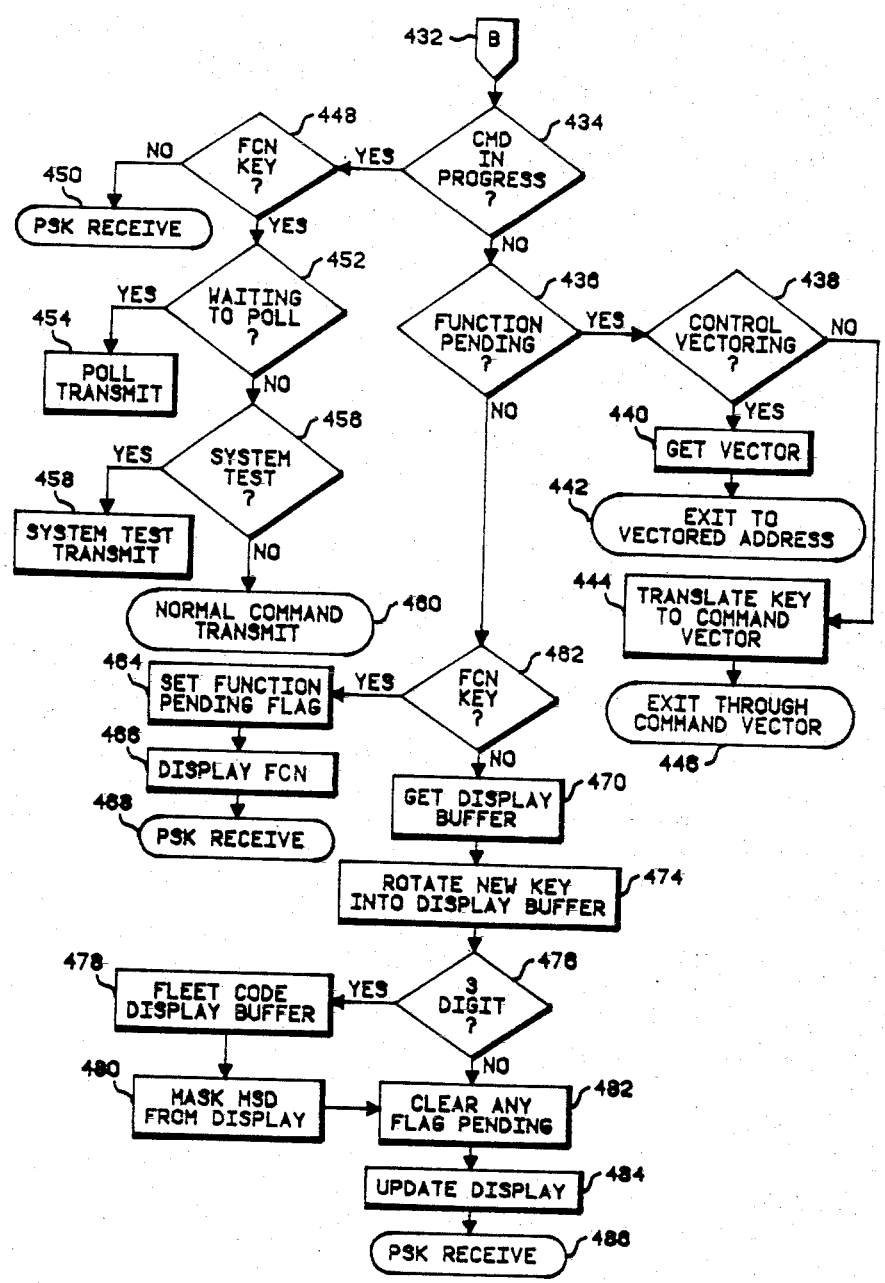

The KEYBOARD HANDLER routine is illustrated in FIGS. 9A, 9B and 9C and is entered by means of a keyboard interrupt as indicated at block 370. The KEYBOARD HANDLER routine at 372, immediately proceeds to get the key which was activiated as indicated at 374 and proceeds to test for the PROM programmer at 376. If yes, then program flow proceeds to return from the interrupt as indicated at 382. In addition, program flow proceeds from 396 if the result is negative at 378 to test for clock initiation, and if that is positive, the program flow proceeds, again, to return from the interrupt as indicated at 382. If the result of the test at 378 is negative, the program flow proceeds to 380 where the "system-test" function as examined. If the result is positive, again, program control returns from interrupt as indicated at 382 and otherwise proceeds to block 384 to determine the key activated, as indicated at block 384. At block 386, the clear key is tested and if positive, the display is cleared as indicated at 388 and program control is transferred to the PSK RECEIVE routine as indicated at 390. Otherwise, program flow proceeds to block 392. At this point, a display pending test is performed and if positive, program control is transferred to PSK RECEIVE routine as indicated at 394, and otherwise proceeds to block 396 to test if a PTT command is in progress. If positive, the routine returns to the PSK RECEIVE routine, as indicated at 398 and otherwise proceeds to block 400 to determine if a poll is in progress. If a poll is in progress, the routine transfers control to the PSK RECEIVE routine as indicated at block 402 and otherwise program flow proceeds to block 404 and from there to block 406 as indicated in FIG. 9B. At block 406, the program tests to see if a "system test" is in progress and if the result is positive, the program flow is transferred to the PSK RECEIVE routine as indicated at 408 and otherwise program proceeds to block 410. At 410, the program tests as indicated for a priority alert in progress and if the result is positive, the program flow proceeds to block 412 to test to determine if a function key had been activated. If the result is negative, the program flow is transferred to the PSK RECEIVE routine as indicated at 414 and if positive, the program flow proceeds to block 416. At block 416, the program tests for the emergency monitor option, if the result is negative the program control is transferred to the PSK RECEIVE routine as indicated at 418 and otherwise proceeds to block 420 where a test for the second function key is performed (two function keys are required to activate an emerging monitor command). If the result is negative, program proceeds to block 422 where the emergency monitor count is incremented and then to the PSK RECEIVE routine as indicated at 424. If the result of the test at 420 is positive, the program proceeds to the emergency monitor transmit, transmitting the emergency monitor packet as indicated at 426. If at block 410, the priority in progress test is negative, program flow proceeds directly to block 428 where the program test of the terminal is waiting for an acknowledge packet. If the terminal is waiting, the program proceeds to the PSK RECEIVE routine as indicated at 430 and otherwise, as indicated at 432, proceeds to block 434 shown in FIG. 9C. At block 434, the program tests for a command-in-progress, and if there is a command-in-progress, the program now proceeds to 448 where the test for a function key (which is used for command execution), is performed. If the result of the test is negative, program flow is transferred directly to the PSK RECEIVE routine as indicated at 450 and otherwise proceeds to block 452 to determine if the system is waiting to poll. If the result is positive, the program flow proceeds to block 454 to transmit the start of the polling sequence, and otherwise proceeds to block 456 to determine if a "system test" is in progress. If a "system test" command exists, then program flow proceeds to block 458 causing a "system test" initiation, and otherwise proceeds to a normal command transmit as indicated at block 460. If at block 434, the command in progress test is negative, program flow will proceed to block 436 and test for a pending function. If the result is positive, the program test for control vectoring is indicated at 438 and if the result is positive, the program fetches the vector as indicated at 440 and than exits to the vectored address as indicated at 442. Otherwise, at block 438, program flow proceeds to block 444 to translate the activated key to a command vector and then exits the program through the command vector as indicated at 446. If at 436, the function pending test is negative, program flow will proceed to block 462 where the key is tested for a function key and if positive, the program will set the function pending flag as indicated at 464. The function will be displayed at 466 and then the program flow returns to the PSK RECEIVE routine as indicated at 468. If the result of the test at 462 is negative, program flow will proceed to block 470 where the display buffer will be obtained (since, at this point, the key is a numeric entry) and a new key will be rotated in the display buffer as indicated at 474. The program proceeds to 476 to test for a 3 digit shared-system configuration and if the three digit mode is present, the program flow proceeds to 478 to move the code into the fleet code display buffer, to 480 to mask the most significant digit from the display buffer, and then to block 482 to clear pending flags. Program flow then proceeds to 484 where the display is updated and then transfers program control to the PSK RECEIVE routine as indicated at 486.

Figure 10A:
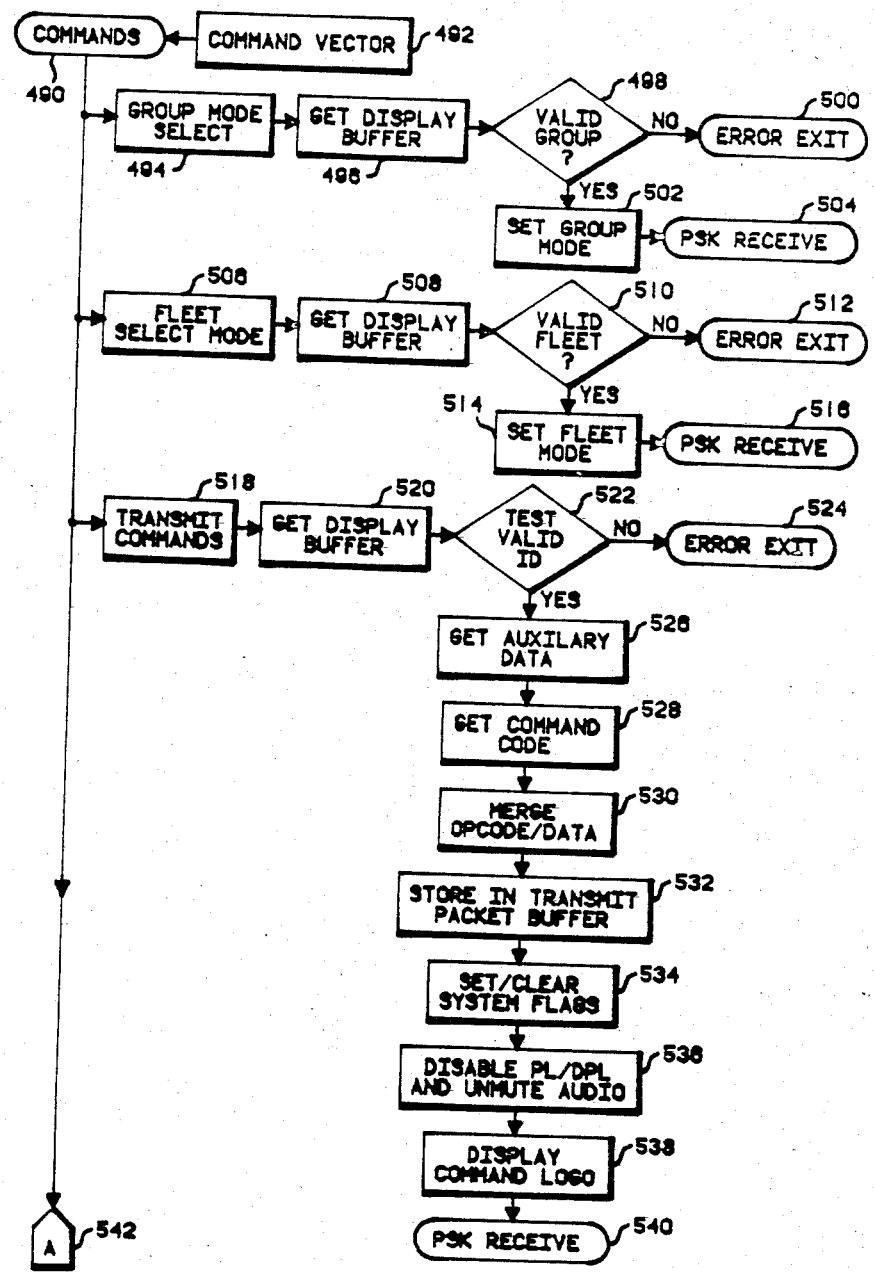
Figure 10B:
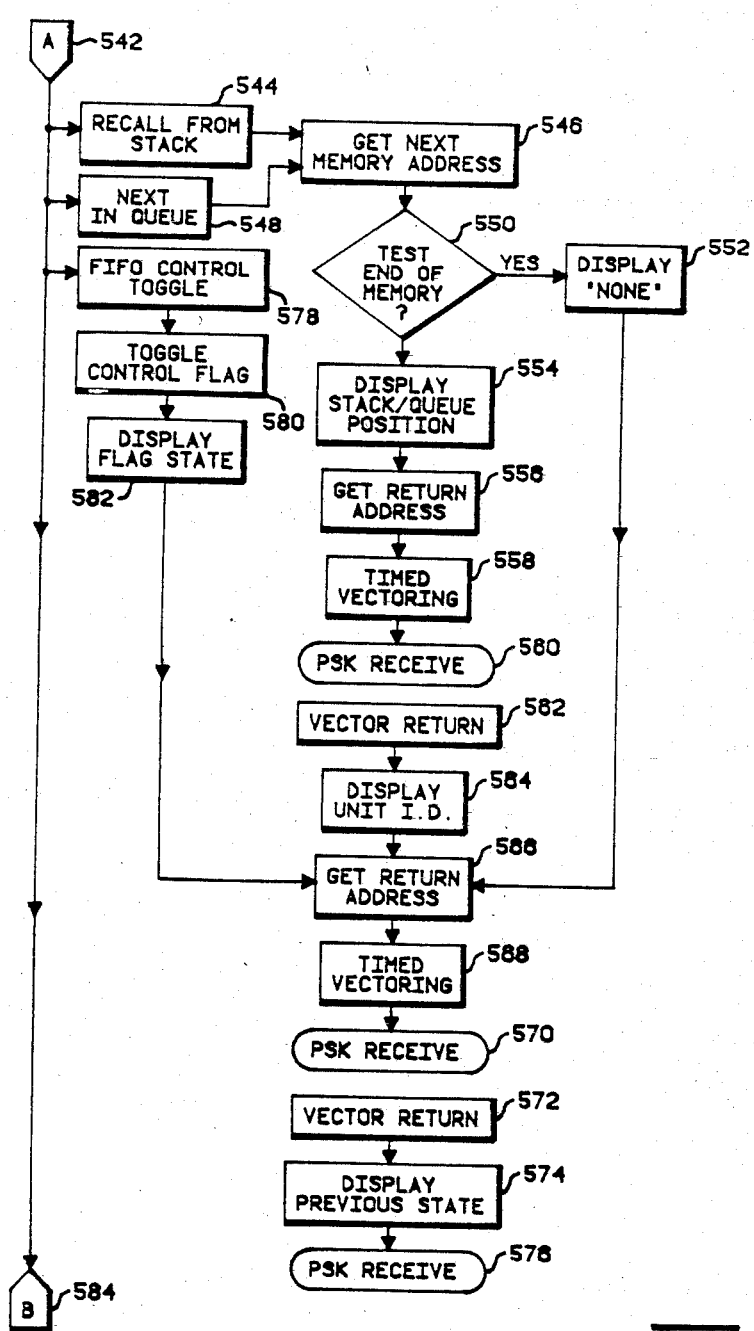

FIGS. 10A, 10B and 10C show a flow diagram of the COMMAND routine for the base unit computer program and as indicated at 492 is entered via a command vector at 490. From the entry point 490 the program flow then proceeds as indicated to one of several possible command modes. If the command is a group mode command, program flow proceeds to the group mode select at 494 and obtains the display buffer as indicated at 496. The program flow then proceeds to 498 where the display buffer is tested for valid group and if the result is negative, performs a error exit as indicated at 500. Otherwise group mode is set as indicated at 502 and program flow proceeds to the PSK RECEIVE routine as indicated at 504. If a fleet select mode is called for, the program flow proceeds directly to 506 and then to block 508 to obtain the buffer display and then to block 510 to test for a valid fleet code. If the results of the test are negative, the program makes an error exit as indicated at 512 and otherwise proceeds to block 514 to set the fleet mode and then transfers program control to the PSK RECEIVE routine as indicated at 516. A transmit command will cause the program control to proceed directly to block 518 and from there to 520 where the display buffer is obtained and tested for valid ID as indicated at 522. If the results of the test are negative, an error exit is executed as indicated at 524 and otherwise program flow proceeds to block 526 to get any auxiliary data. The program then proceeds to block 528 to obtain the command code to 530 to merge the OP code and data, and then proceeds to store the result in a transmit packet buffer as indicated at 532. The system flags are set or cleared as required as indicated at 534 and the PL or DPL and the audio muting are disabled as indicated at 536. The command logo is then displayed on the display as indicated at 538 and the program flow proceeds to the PSK RECEIVE routine as indicated at 540 (awaiting command execution).

The command subroutine continues from FIG. 10A to FIG. 10B as indicated at block 542. If a recall or a next in queue command occurs, the program flow proceeds to 546 to get the next memory address as indicated by block 544 and 548. Once the next memory address has been obtained, the program proceeds to 550 to test for end of memory. If the result is negative, the program proceeds to block 554 to display the stack or queue position, and then to 556 to get a return address. Program flow then proceeds to block 558 for time vectoring and then exits to the PSK RECEIVE routine as indicated at 560. If the result of the test at 550 is positive, the program causes none to be displayed as indicated at 552 and proceeds, as shown, to block 566. Block 566 may also be entered by a vector return as indicated at 562 following a display of the unit ID indicated at 564. In addition, the block 566 may be entered as a result of a first in, first out queue control toggle command as indicated at 578 which results in toggling of the control flag as indicated at 580 and a display of the flag state as indicated at 582 followed by transfer to block 566 to get a return address. Program flow then proceeds to block 568 for timed vectoring and then transfers program control to the PSK RECEIVE routine as indicated at 570. The command routine is continued in FIG. 10C as indicated by block 584, where if a secondary command occurs, entry is at 586 and the program proceeds to display FNC 2 as indicated at 588 and then sets the keyboard vector flags as indicated at block 590. Then the return address is obtained at 592 and waits for the key entry by way of an untimed vector at 594. Once the key entry has occured, program flow is transferred to the PSK RECEIVE routine as indicated at 596. Block 598 is entered via vector return and program flow proceeds to block 600 to get the entered key value and translate and then proceeds to block 602 to vector to the secondary command and than to 604 to perform the secondary command or function required. Program flow is then transferred to the PSK RECEIVE routine as indicated at 608.

Figure 11A:
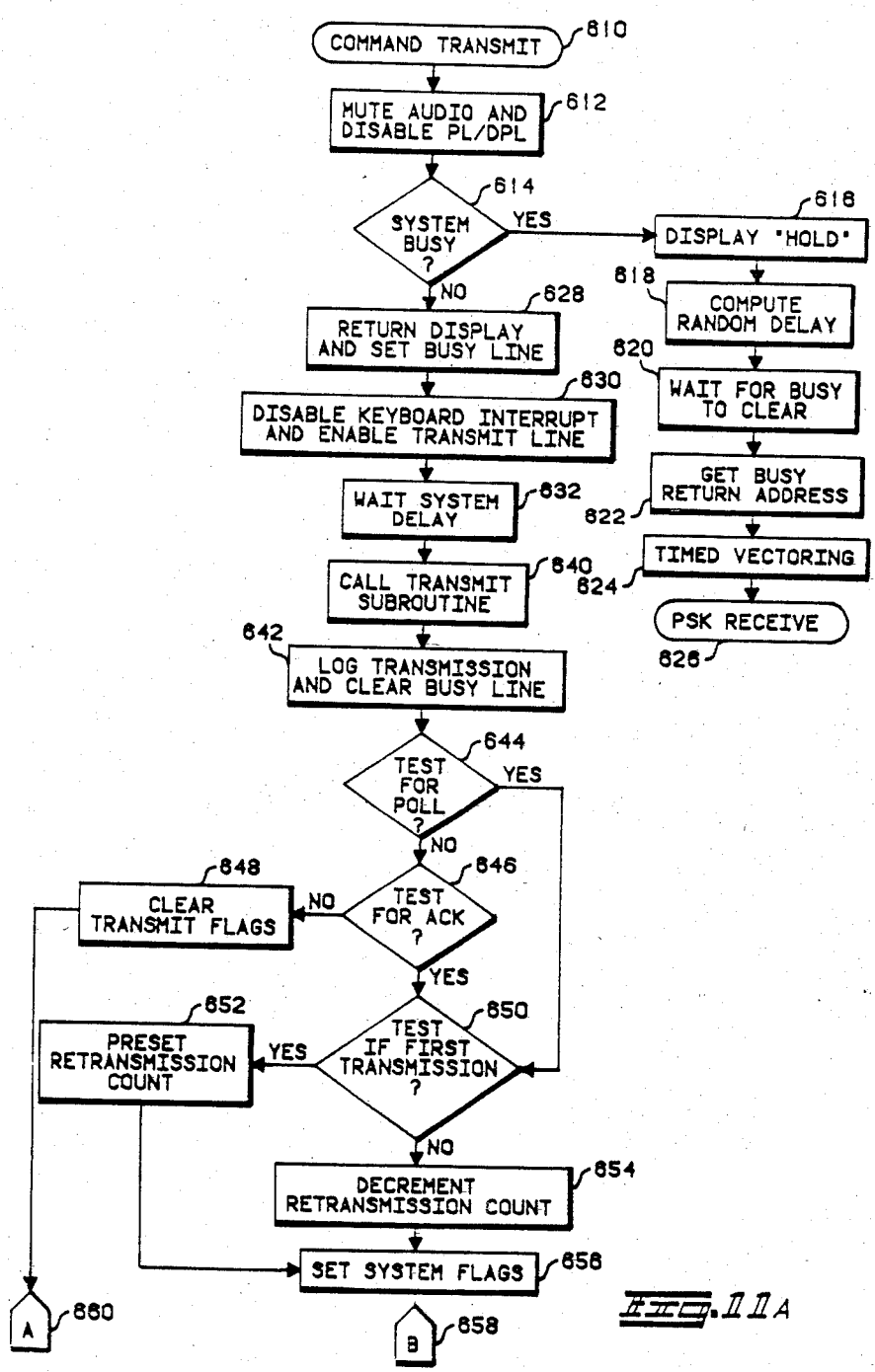
FIGS. 11A and 11B form a flow diagram of the COMMAND TRANSMIT routine for the base unit computer program for the invention.
Figure 11B:
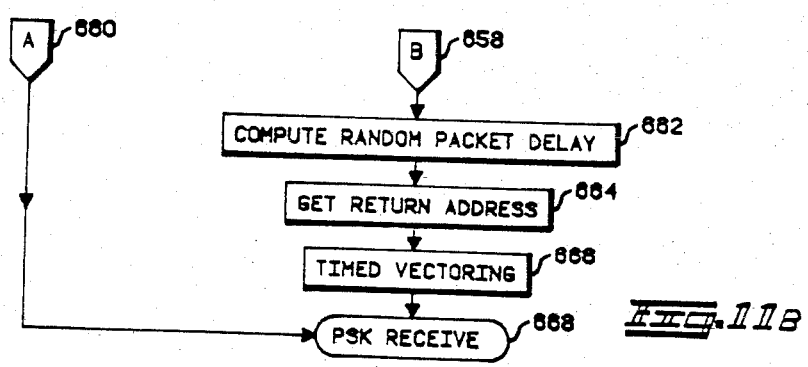

A flow diagram of the command transmit routine for the base unit computer program is illustrated in FIGS. 11A and 11B. The program is entered at 610 and proceeds to block 612 where the audio and PL or DPL are disabled. The program flow then proceeds to a system test to determine if it is busy as indicated at 614 and if the result is positive, the program displays "hold" on the display as indicated at 616 and then computes a random delay at 618 and waits for the busy to clear as indicated at 620. The program flow continues to block 622 to get a busy return address and then to 624 for timed vectoring and proceeds to transfer program control to the PSK RECEIVE routine as indicated at 626. If the result of the test at block 614 is negative, the program flow advances to block 628 to set the busy line and the display. The program flow then proceeds to block 630 disabling the keyboard and enabling the transmit line and waits for the preprogrammed system delay as indicated at 632. The program flow then continues to block 640 where the TRANSMIT sub-routine is called and then to 642 to log the transmission on the printer and clear the busy line. A test for polling is then performed at block 644 and if the result is negative, a test for acknowledge is performed as indicated at 646. If the result of that test is negative, program flow proceeds to block 648 clearing the transmit flags and then as indicated by block 660 and 668 of FIG. 11B program flow is transferred to the PSK RECEIVE routine. If, however, the result of the test for acknowledge at block 646 is positive, program flow proceeds to block 650 to test if this is the first transmission. It should also be noted that if the test at 644 is positive, the program flow proceeds to block 650. If the result of the test at block 650 is negative, program flow advances to block 654 and decrements a retransmission count and then sets the system flags as indicated at 656. If the result of the test at block 650 is positive, the retransmission count will be preset as indicated at 652. Program flow will then proceed to block 656 to set the system flags and from there to block 662 as indicated by block 658. A random packet delay is computed at block 662 and then the return address is obtained as indicated at 664. Program flow then continues to block 666 for timed vectoring and to block 668 where the program control is transferred to the PSK RECEIVE routine.

Figure 12:
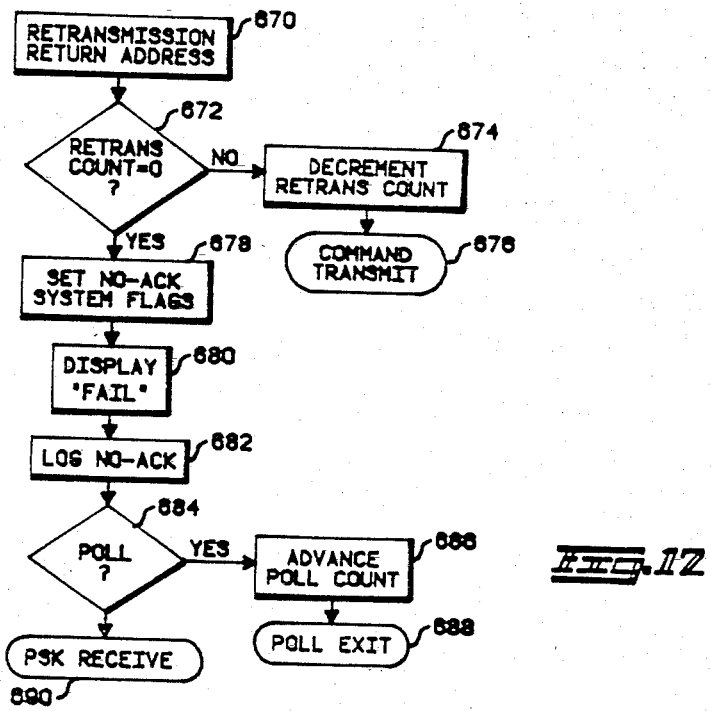
FIG. 12 is a flow diagram of the RETRANSMISSION routine of the base unit computer program for the invention.

FIG. 12 illustrates a flow diagram of the RETRANSMISSION routine of the base unit computer program. The RETRANSMISSION routine is entered at 670 where the return address is obtained and proceeds to block 672 to test for the retransmission count equaling zero. If it is not zero, the program control advances to 674 where the retransmission count is decremented and program flow is then transferred to the COMMAND TRANSMIT routine as indicated at 676. If, however, the result of the test at 672 is positive, program control is transferred to block 678 where the non-acknowledge flag and system flags are set and to block 680 where the "fail" indication is displayed. The program flow continues to block 682 where the no acknowledge is logged on the printer and the program proceeds to block 684 to test to see if a poll is in progress. If the result is negative, program flow is transferred proceeds to the PSK RECEIVE routine as indicated at 690. If the result of the test at 684 is positive, the poll count is advanced as indicated at 686 and an exit to the POLL EXIT routine is executed as indicated at 688.

Figure 13:
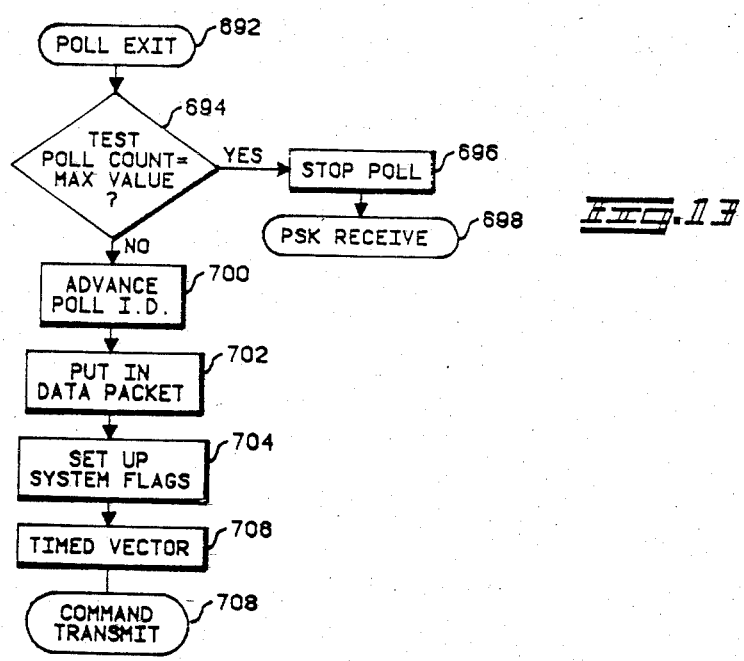
FIG. 13 is a flow diagram of the POLL EXIT routine of the base unit computer program for the invention.

A flow diagram of the POLL EXIT routine for the base unit computer program is shown in FIG. 13. The POLL EXIT routine is entered, as shown, at 692 and program flow immediately proceeds to block 694 where the poll count is tested to determine if it is equal to the pre-programmed maximum value. If the result is positive, the poll is stopped as indicated at 696 and program control is transferred to the PSK RECEIVE routine as indicated at 698. If the result of the poll test at 694 is negative, the program flow continues to block 700 and advances the poll ID number and then proceeds to block 702 to set up the data packet and to 704 to set the system flags. The program flow then proceeds to block 706 or timed vectoring and exits to the COMMAND TRANSMIT routine as indicated at 708.

Figure 14:
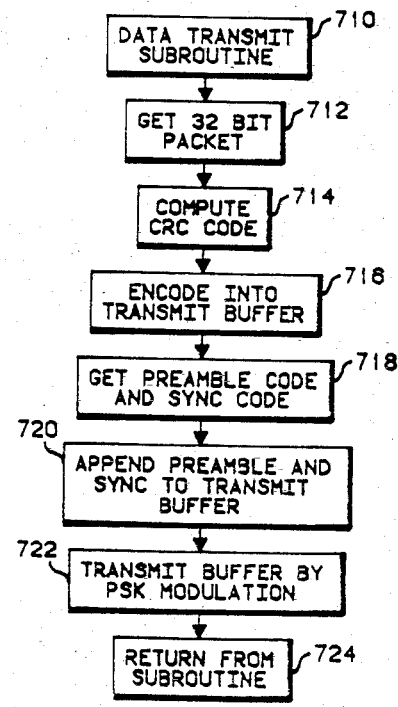
FIG. 14 is a flow diagram of the DATA TRANSMIT subroutine of the base unit computer program for the invention.

The DATA TRANSMIT sub-routine flow diagram is shown in FIG. 14 and as indicated, the sub-routine is entered at block 710. The program flow proceeds immediately to block 712 where the 32 bit data packet is obtained and then the CRC code is computed at block 714. The data packet is then encoded into the transmit buffer as indicated at 716. The program flow then proceeds to block 718 where the preamble code and sync code are obtained and appended to the transmit buffer as indicated at block 720. The entire data packet is transmitted by the transmitter using PSK modulation as indicated at 722 and the program control returns from the sub-routine as indicated at 724.

Figure 15:
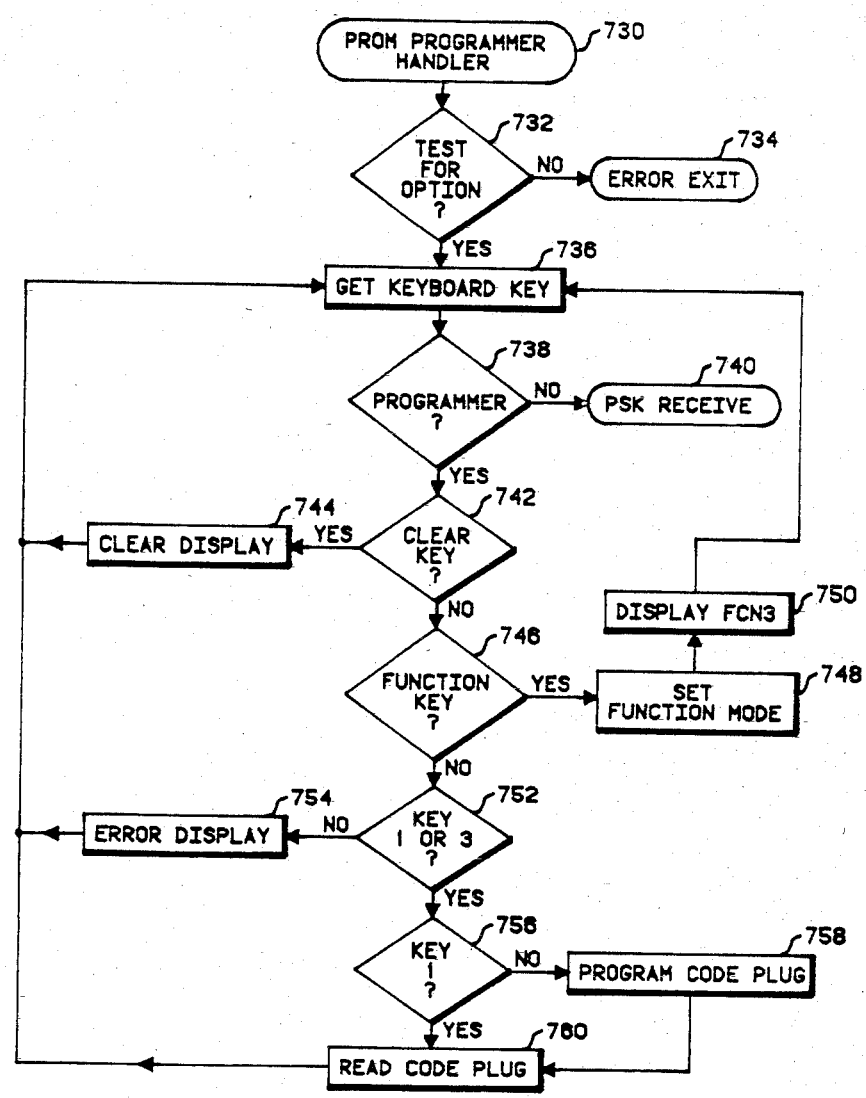
FIG. 15 is a flow diagram of the PROM PROGRAMMER HANDLER routine of the base unit computer program for the invention.
Figure 15:
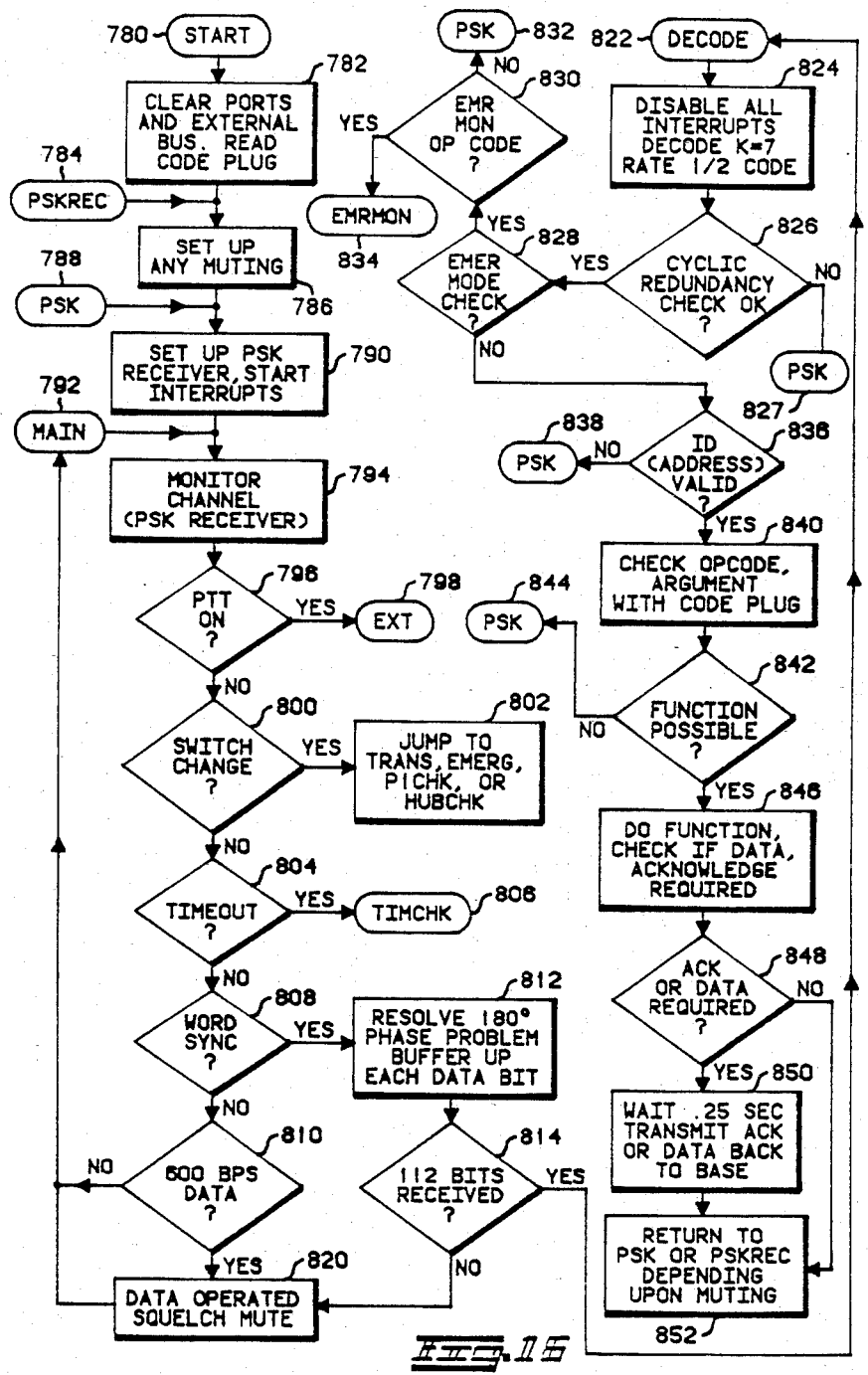

FIG. 15 shows a flow diagram of the PROM PROGRAMMER HANDLER routine for the base unit computer program. The PROM PROGRAMMER HANDLER routine is entered, as shown, at 730 and program control proceeds immediately to 732 to test for the indicated option. If the result is negative, an error exit is executed as indicated at 734, and if the result of the test is positive, the program flow advances to block 736 to get the keyboard key. Program flow then proceeds to block 738 where a test is performed to determine if the programmer is connected and if the result is negative, the program control is transferred to the PSK RECEIVE routine as indicated at 740. If the result is positive, however, program control continues to 742 where the key is tested to determine if it was a clear key. If the result is positive, the display is cleared as indicated at 744 and the program control transfers back to block 736. If, however, the result of the test at 742 is negative, program flow will proceed to block 746 where the key is tested to determine if it is a function key. If the result is that it is a function key, the program flow advances to block 748 where the function mode is set and to 750 where the FNC 3 indication is displayed. Program flow is then transfered back to 736. If the result of the function key test is negative, the program then proceeds to block 752 to test to determine whether the one or three key was activated. If the result is negative, an error indication is displayed as indicated at 754 and the program flow is transferred back to block 736, as shown. If the result of the test at 752 is positive a test to determine if the one key has been activated is performed at 756 and if the result is negative (meaning the three key way pressed) the code plug is programmed as indicated at 758 and the program flow proceeds to block 760 to read and display the code plug. If the result of the test at 756 is positive, the code plug is read as indicated at 760 and the program flow then proceeds back to block 736.

Referring now to FIG. 16, there is shown a flow diagram of the START routine of the mobile unit computer program. It should be immediately noted that the START routine can be entered at four entry points indicated as START at block 780, PSKREC at block 784, PSK at block 788 and MAIN at block 792. Entering the START routine at block 780 the program flow proceeds directly to 782 where the ports and external bus are cleared and the code plug is read. At this point, the PSK REC entry point at 784 permits entry to block 786 where program flow proceeds to set up the necessary muting. After block 786, the entry point PSK indicated at 788 permits entry to the next flow position at 790 which sets up the PSK RECEIVER and the START interrupts. Program flow then proceeds to block 794 which can also be entered from the MAIN entry point indicated at 792, where the channel monitoring is performed utilizing the PSK RECEIVE routine. Program flow continues to block 796 where the PTT switch is checked to determine if it is on, and if the result is positive, the program exits to the EXT routine as indicated at 798. If the test at 796 is negative, the program flow advances to block 800 where the program tests for a switch change and causes the program control to transfer to either the TRANS routine, the EMERG routine the P1CHK routine, or the HUBCHK routine, determined by which type of switch change occured, as indicated at block 802. If the test shows that no switch change has occured the time out timer is checked to see if it has timed out, as indicated at 804, and if the result is positive, program control is transferred to the TIMCHK routine as indicated at 806. If time out has not occured, then program flow proceeds to 808 there a test for word sync is performed. If word sync exists, than program flow proceeds to block 812 where phase ambiguity is corrected in a data buffer. Program flow will then continue to block 814 where the received data word is checked to determine if the full 112 bits have been received, and if the result is negative, program flow proceeds to block 820 where the data operated squelch provides muting. In addition, if the test result at block 808 was negative, program flow would proceed to block 800 where a data operated squelch (such as that described in a copending application filed Dec. 7, 1981 by Scott Noble with Ser. No. 328,359 and assigned to Motorola, Inc.) tests for presence of data and if data is detected then program flow proceeds to block 820 to will mute the audio and transfer control back to block 792 which is the MAIN entry point to the routine. If the result of the test at 810 is negative, program flow will proceed directly to block 792 and then directly to block 794, as shown. A positive result in the test of block 814 will result in program flow being directed to block 822 to the decode section of the routine. Program flow then advances directly to block 824 where all interrupts are disabled and the 112 bit data is decoded. The program flow then proceeds to 826 where a cyclical redundancy check determines the validity of the data. And if the result is negative, program control is transferred from block 827 to the PSK input of the routine at 788. If the result of the test at 826 is positive, the program flow continues to 828 where a test is made to determine if the system is in the emergency mode. If yes, program flow proceeds to block 830 where a check is made for the emergency monitor OP code. If the result is positive, the program control is transferred to the EMRMON routine as indicated at 834 and otherwise to the PSK input of the routine as indicated at 832. If the result of the check at block 828 is negative, program flow transfers to block 836 where the ID address is checked for validity, and a negative result causes the program flow to be transferred to the PSK input of the routine, as indicated at block 838. If the result of the test at 836 is positive, the program flow proceeds to block 840 where a check is made of the OP code and argument against the code plug to verify that the unit has been programmed to handle the option indicated. At block 842, the program checks to determine if the function indicated is possible, and if the result is negative, the program flow is directed to the PSK input of the routine as indicated at 844. If the result is positive, program control proceeds to block 846 where the function is performed and need for data acknowledge checked, as shown in block 848. If the result is negative at block 848, program flow advances to block 852 where program control will be transferred either to the PSK or the PSK REC input of the routine depending upon muting, as indicated. If the result of the test at 848 is positive, a quarter second wait will occur before a transmission of acknowledge or data back to the base, as shown at 850.

Figure 17:
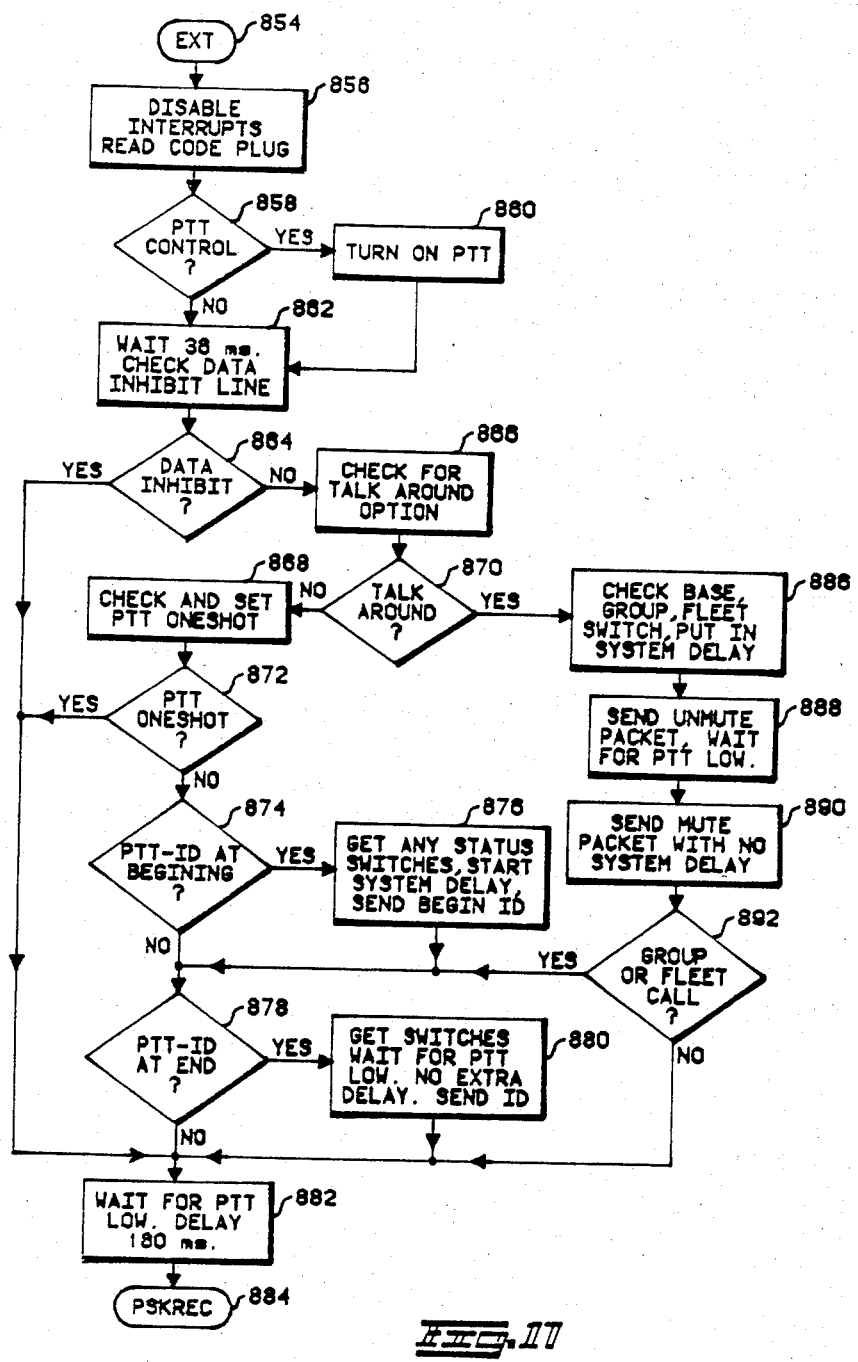
FIG. 17 is a flow diagram of the EXT routine of the mobile unit computer program for the invention.

FIG. 17 shows a flow diagram of the EXT routine of the mobile unit computer program and is entered as shown at 854. Program flow proceeds directly to 856 where the interrupts are disabled and the code plug is read and then at 858 the program tests the code plug data to determine if the unit has PTT control. If the result is positive, program flow proceeds to 860 where the PTT is turned on and to block 862. If the result of the test at 858 is negative, the program flow advances directly to block 862 where approximately a 36 millisecond wait occurs to permit a check of the data inhibit line. The data inhibit line is then checked as indicated at 864 and if the result is positive, program flow is transfered to block 882 as shown where the program waits for a PTT signal for 180 milliseconds while the receiver is muted. If, however, the result of the check at block 864 is negative, a check for the talk around option will be made as shown at block 870. If the result of the test at 870 is negative, program flow will proceed to block 868 and 872 where the PTT one shot will be checked to determine if it is set and if the result is positive, the program flow will proceed to block 882 as shown. If the result is negative, the program flow will proceed to block 874 where the code plug will be tested to determine if a PTT ID is to be generated at the beginning, and if the result is positive, then the necessary status switches are obtained and the system delay is started following which the ID is sent at the beginning of the transmission, as indicated at 876. Program flow will then continue to block 878 where the code plug is checked to determine if a PTT ID is to be sent at the end of the transmission. In addition, if the result at block 874 is negative, program flow will proceed to block 878 and if the result of the test at block 878 is positive, the switch values will be determined and the system will wait for the PTT switch to be deactivated and an end of transmission ID will be sent as indicated at 880. Program flow will then advance, as shown, to block 882 after which the program flow will return to the PSK REC input of the START routine. If the result of the test at block 870 is positive, the base, group, and fleet ID's and switches are checked and system delay is added in at 880. Followed by sending of the packet and a wait for an end of transmission signal from the PTT. Program flow then proceeds to block 890 where the mute packet is sent with no system delay followed by a test for group or fleet call as indicated at 892. If the result at 892 is negative, program flow will advance directly to block 882 as indicated, and if the result is positive, program flow will transfer to block 878 to determine if an end of transmission ID should be sent. The program flow is then transfered from block 882 to the PSK REC entry point of the START routine as indicated at 884.

Figure 18:
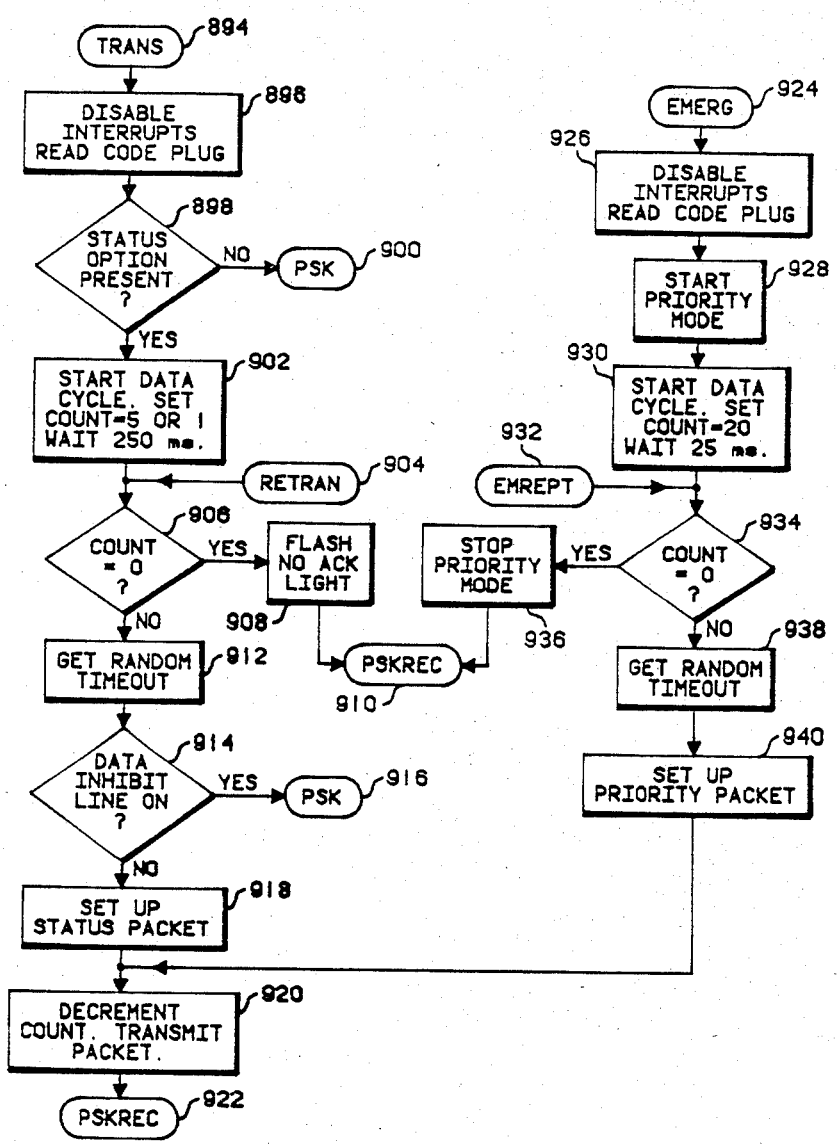
FIG. 18 is a flow diagram of the TRANS-EMERG routine of the mobile unit computer program for the invention.

A flow diagram of the TRANS/EMERG routine of the mobile unit computer program is shown in FIG. 18. This routine can be entered at four points indicated as TRANS at 894, EMERG at 924, RETRAN at 904, and EMREPT at 932. Entering the program at TRANS indicated at 894 program flow proceeds directly to block 896 where the interrupts are disabled and the code plug data is read whereupon a test is made to determine whether the status option is allowed as indicated at 898. If the result is negative, the program flow transfers to the PSK input of the START routine as indicated at 900 and if the result is positive, the program flow advances to 902. At 902, the data cycle is started wherein a low is put on the data cycle line to indicate status is being sent and the transmission count is set or a wait period is established to allow channel scan. Subsequently, program flow will proceed to block 906, however, block 906 can be entered from block 904 the RETRAN entry point. At block 906 the count is tested to determine if it is equal to zero and if the result is positive, the no acknowledge light will be activated as indicated at 908 and program flow will transfer to the PSKREC input of the START routine as indicated at 910. If the result of the test at 906 is negative, a random time out period is fetched as indicated at 912 followed by a test of the data inhibit line at 914. If the data inhibit line is on, the program flow will be transfered to the PSK input of the START routine as indicated at 916 and if the line is not on, the status packet will be set up as indicated at block 918. Program flow will then continue to block 920 where the count will be decremented and the packet transmitted and the program flow will be transferred to the PSK REC input of the START routine as indicated at 922. If however, the routine is entered at the EMERG entry point indicated at 924, program flow proceeds directly to block 926 where the interrupts are disabled and the code plug is read. The program then continues to block 928 where the priority mode is started followed by starting the data cycle and setting the transmission count in establishing the required wait period as indicated at 930. Program flow then advances to block 934 however, this point of the program can be entered at the entry point EMREPT as indicated at 932. At block 934, the count will be tested to determine if it is equal to zero and if it is, the priority mode will be stopped, as indicated at 936, and program flow will be transferred to the PSK REC input of the START routine as indicated at 910. If the count is not equal to zero, program flow will advance to block 938 where the random time out period is fetched followed by set up of the priority packet as indicated at 940. Program flow will then proceed to block 920 where the count will be decremented and the packet transmitted followed by a transfer of program control to the PSK REC input of the START routine as indicated at 922.

Figures 19, 20:
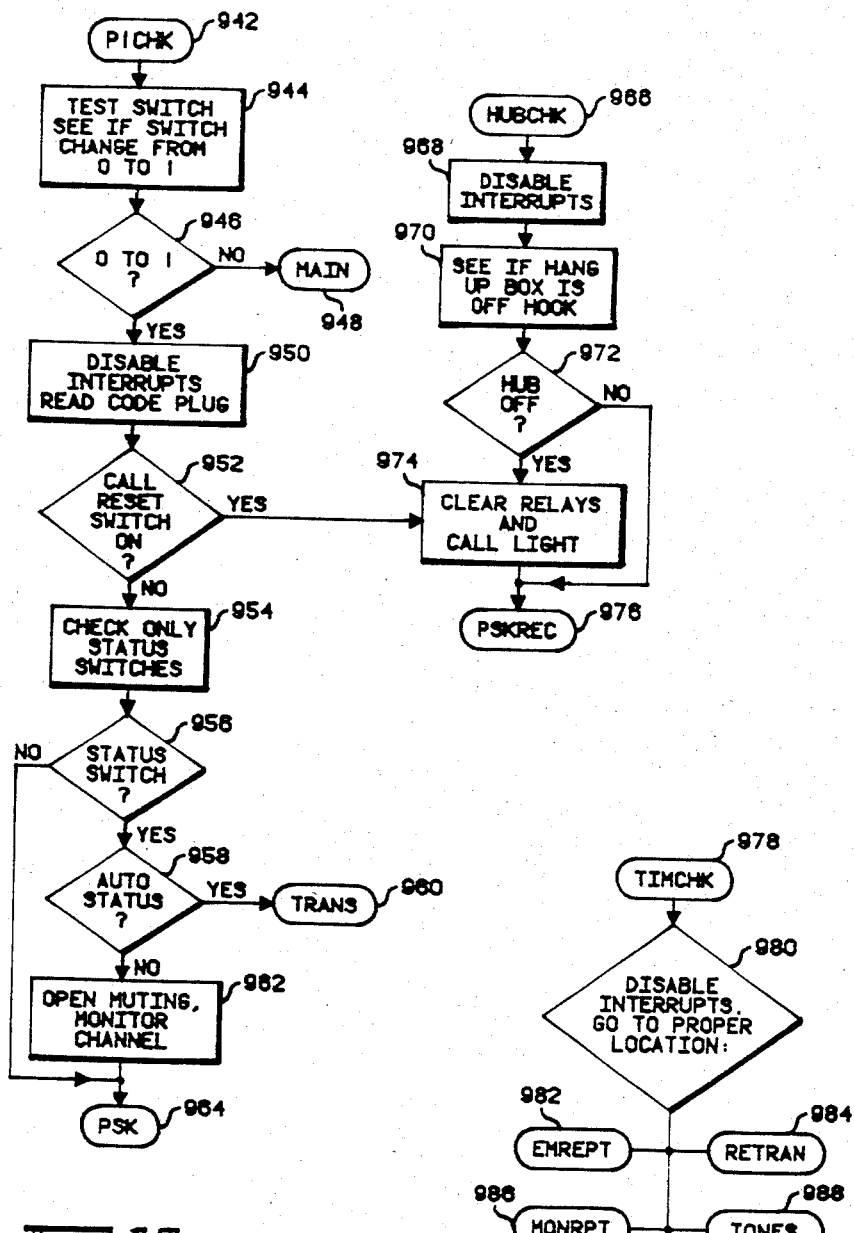
FIG. 19 is a flow diagram of the P1CHK-HUBCHK routine of the mobile unit computer program for the invention.
FIG. 20 is a flow diagram of the TIMCHK routine of the mobile unit computer program for the invention.

Referring now to FIG. 19, there is shown a flow diagram of the P1CHK/HUBCHK routine of the mobile unit computer program. This routine may be entered at two points; the P1CHK entry point indicated at 942 and the HUBCHK entry point indicated at 966. If the routine is entered at 942, program flow will proceed directly to blocks 944 and 946 where the switch will be tested to determine if it has changed from a zero to a one. If the result of the test of the switch at 946 is negative, the program flow will transfer to the MAIN input of the START rountine as indicated at 948, and if the result of the test is positive, the program flow will advance to block 950 where the interrupts will be disabled and the code plug will read. Program flow will then continue to block 952 where the call reset switch will be checked to determine if it is on. If the call reset switch is on, relays and call lights will be cleared as indicated at 974 and the program control will then be transferred to the PSK REC input of the START routine as indicated at 976. If, however, the result of the test at 952 is negative, program flow will proceed to block 954 and 956 where the status switches will be checked to determine if there has been a change. If no change has occured, program flow will transfer, as indicated, to 964 and if the result is positive, the program will continue to block 958 where a test is made to determine if the auto status option is available. If the result is positive, program control is transferred to the TRANS routine as indicated at 960. If the result of the test at 958 is negative, program control proceeds to block 962 where muting will be opened to permit channel monitoring. Program flow will then be transferred to the PSK input of the START routine as indicated at 964. If the routine is entered at the HUBCHK entry point indicated at 966, program flow proceeds directly to 968 where the interrupts are disabled. The hangup box will then be checked to determine if it is off hook as indicated at 972. If the result of the test at 972 is negative, program flow will proceed directly to 976 and if the result is affirmative, the relays and call light will be cleared as indicated at 974. The progam control will then be transferred to the PSK REC input of the START routine 976.

FIG. 20 shows a flow diagram of the TIMCHK routine of the mobile unit computer program and is entered as shown at 978. The program flow proceeds to block 980 where the interrupts are disabled and the program then vectors program control to the proper routine as indicated by blocks 982, 984, 986, and 988. FIG. 21 shows the flow diagram of the EMR MON routine of the mobile unit computer program and, as indicated, this routine is entered at block 990. Program flow proceeds directly to block 992 where the argument is checked to determine if it is equal to 0 and if the result is positive, program flow proceeds directly to block 994 where the priority mode is stopped if it is on and then to block 996 where program control is transferred to the PSK REC input of the START routine. If the result of the test at 992 is negative, the priority mode is checked to determine if it is on as indicated at 998. If the priority mode is not on, the PTT is disabled as indicated at 1202 and if it is on, the PTT is turned on as indicated at 1000. The program control then advances to block 1004 where the variable COUNT is set to equal the argument afterwhich the count is decremented at 1008. In addition, the routine may be entered at this point at the entry point MONRPT indicated at block 1006. Program flow will advance from block 1008 to block 1010 where the count will be tested to determine if it is equal to 0. If not equal to 0, program flow will transfer directly to block 1014 and if it is equal to 0, then the program flow will continue to block 1012 where the PTT is turned off. The program control will then transfer to the PSK input of the START routine as indicated at block 1014.

A flow diagram of the TONES routine of the mobile unit computer program is shown in FIG. 22. The routine is entered at block 1020 as indicated and program flow proceeds directly to block 1022 where the tone count is decremented. The COUNT is then checked to determine if it is equal to 0 at 1024 and if the result is positive, the program control is transferred to the PSK input of the START routine as indicated at 1026. If the test at 1024 is negative, the program flow proceeds to block 1028 where the time out timer is set up after which the alert tone is generated, as indicated at 1030. Program flow then continues to block 1032 where the transmission switch is checked to determine if it is on, and if it is, the program flow jumps back to block 1030 where a tone is generated. If the trans switch is not on, program flow proceeds to block 1034 where a 300 millisecond wait occurs before returning to the START routine at either the PSK or the PSK REC input.

In summary, an improved data signalling system particularly well adapted for use in multiple unit radio communications systems, capable of both voice and data communications, has been described.

While a preferred embodiment of the invention has been described in detail, it should be apparent, that many modifications and variations thereto are possible, all of which fall within the true spirit and scope of the invention.

APPENDIX I

The following is a memory dump of the computer program for the base unit MC6803 microcomputer according to the invention.

```
:108000028432920434F505952494748542031 3979
:1080100038322C204D4F544F524F4C4120494E4343
:108020002E54494D204255524B4500010102010298
:108030000283010202830283838401020283028 39A
:10804000838402838384838484850102020302 0380
:1080500003840203038403848485020303840 3846A
:1080600084850384848584858586010202030 20356
:1080700003840203038403848485020303840 3844A
:108080008485038484858485858602030304030430
:108090000485030404850485858603040485048 51A
:1080A0008586048585868586868 70B0906030008F4
:1080B00005020A0704014F97089 7B68608970 0CE75
:1080C0000190B64817462505BD85F42003BD85F00F
:1080D000F668009602BD8F7E16C10C240FCE80AAD2
:1080E0003AE600D7A096A2850427043BD7C03B8E72
:1080F0000000FFC10B2623D6A42B12853A26119 6A386
:10810000854 8260BC50B2607BD8D6C3F7E945ABD56
:1081100008 63FBD8D7DBD8D963F96A3 2BEE85082 6AF
:10812000EA96A4858126E496A2852027 13C10A2613
:10813000DAB64816850827D373 00BF2 6CE7E862A76
:10814000851026C785082717C10A26BF96A4850271
:1081500026078540260 67E8680 7E8663 7E944A8535
:1081600022720DEC496A48 50827026E00CE4800B0
:108170 003AE600863FC1FF275ED7A1CE81E33AEE03
:1081 8000006E00C10A260F860297A297B57F00CE27
:10819000C630BD8C033F96B527064F5F97B5DDB35C
:1081A000DCB3BD8F79DAA08D21BD8D8DBD8D963F5D
:1081B000F6480BC4F0D79DF6480DC4F0D19D2609B2
```

```
:1081C000F64811585858D19D39D7B48DE2260435
:1081D000840F9A9D97B3398E00FFBD860DCE93AB69
:1081E0007E939E821382B882FF832E8336833E83E2
:1081F0009A83B383BB83C383CB83D383DB83E38340
:10820000EB83F384058405849C83609352853B85CE
:10821000A193D7CE8252DFC6C610BD8C0386F097DD
:10822000A1CE8230DFC4CC0200DDA2860897A43F35
:108230009 6A0810A26037E846FD6B527055FD7B541
:10824000D7A1D6A1BD8F79DAA0BD851EDDCABD8DAF
:108250001D3FBD82EF97BAD6B1C1EF271DD7B9CC6C
:10826000507DDDD1D6BABD851EDDCFCC0040DDA26C
:108270005FD7CEBD81CABD8D093FCE82A9DFC6CCF6
:1082800000040DDCACC3871DDCCBD8D1DCE8297DFBC
:10829000C486EF97A1208FD6A0C10A26037E846FE3
:1082A000CAE0BD851E97CA20A596A181EF26058646
:1082B000667E81D797B920A786FF97BA96B181EFDE
:1082C000271C8AE097B9BD81B02717840F16BD859A
:1082D0001E97CFC640D7D0CC3871DDD1208D86FF18
:1082E00097B9CC3838DDCFCC7700DDD17E826B9664
:1082F000A191B0250591AF220139864F7E81D70D1E
:108300008D6CCC6204DDB78611F6481DC5202602AF
:108310009703BD8883B64816852026 06D687C4BF06
:10832000D7B7D6A1C00458CE8C9ABD8C063F0D8D10
:108330003DCC620520CF0D8D35CC620E20C70D8D52
:108340002DCE8349DFC67E8218CC0920DDA2BD82F6
:10835000EF97B8866E97B7BD8D09860A97A120A7BB
:108360000D80BCC6385209D96A38A1897A3DCA264
:108370008A09C4DF240FCA20C540270986067E81EA
:10838000D7865B20F9DDA2C540260EDCB3DDB993AC
:10839000AD25EEDCAB93B925E8390C8DD1CC238328
:1083A000DDB7D6A3C5402608CA20D7A38A4097B711
:1083B0007E83070C8DB8CC238220E50C8DB0CC23B6
:1083C0008120DD0C8DA8CC238020D58D2DCC23865B
:1083D0007E83050C8D98CC2A0E20C50C8D90CC2A5E
:1083E0000C20BD0C8D82CC2A1020E50C8D80CC2A6F
:1083F0001D20AD8D05CC238420D60DBD836E96A3A4
:10840000 84DF97A3390DBD836EDCB9DDA67F00A59F
:10841000CE8479DFC696B297CECC0909DDCADDCC11
:10842000BD8D20CC0200DDA2860897A4CE8432DF69
:10843000C43FB648172A29D6A026075FD7CEBD8DEO
:10844000203FC10A2729C10927E7C1082607B648E6
:1084500014851027DC6ACE92B03AE600DACE20DC42
:10846000D6A0C10A2709D6CEBD8F79DAA020CD7F4C
:10847000 00A47F00A2DEC66E00D6CED7A896A1C605
:108480005812227 02C604D7B8866297B7C602D7ED
:10849000A4CC0920DDA27F00CE7E83070CBD836EB5
:1084A000DCA2DDB7CE84ADDFC64F7E8417DCB7DD3E
:1084B000A2D6CE86257F00CE7E83A0CE84CFDFC419
:1084C000D6A3C440CA804FDDA2CE0258DF9E3FD65D
:1084D000A3C440D7A3BD8DC6BD8D093FB64818467D
:1084E0002505866D7E81D796C22603 7E95D7BD88E9
:1084F000AAD693BD8F79DA928D24DDCA5D2604C693
:108500003FD7CBD695C403BD8F79DA948D10DDCCDF
:10851000BD8D1D8604B76000CE93AB7E939ED7A120
:10852000C40FCE8D623AA6009 78E96A1BD8F7E169F
```

```
:1085300027O6CE8D623AE600968E39D6E12714D70B
:108540O0A18DDBDDCACC4000DDCCBD8D1DCE855EAE
:108550007E84BEC600BD8C03CE855E7E84BE96E260
:108560000C6043DC37800373638EC00260CEC0226F2
:10857000O8C604BD8C037E84BBECOOD7CE5F4D26BD
:108580000054CA700C620D7A2EC02DDB3BD8D997FB4
:10859000O0A3DCE18B01195CC14026024F5FDDE1E5
:1085A0003FDED99CDB27CABD9335FD996DE8B9998
:1085B0001997DE96DD89991997DD9CDB27B3DCDD01
:1085C000BD8F79D78E978FBD8CE686779 7B59 7CF7D
:1085D000BD8D09CE85D97E84BEDED9BD9335A60278
:1085E00097CEEC00DDB3BD8D8DBD8D993FCE019052
:1085F000C617D701CC0136D30BDD0B960885402773
:108600000FA880197080926ECC615D70139CE5079AA
:10861000DFCC5FDDCABD8D1D860336CE00C88DD090
:10862000CE00C88DCF324A26F1398D13BD8883BD67
:1086300083FACC2386DDB797BE862897A12044967F
:10864000BD84FE97BD39DCA6BD9341DDA63996A554
:10865000B1481224O0A8DEFDDB9270493AB2304BD82
:108660008D8D3FCC0180DDA2860197A4CE8674DF7C
:10867000C47E84C9DCB9DDB3BD8D96CC0820DDA2F3
:10868000BD88898611F6481DC520260286159703E8
:10869000BD87AA0F8D632A13C614BD8C038D6896FF
:1086A000A38A8097A3CE8693DFC43FBD8D09BD8783
:1086B000B3C608D700F74000C614D703BD87CAB6B3
:1086C000481785042705BD87842003BD878A861542
:1086D00097019703 96A42B18BD978BDCA2C5202683
:1086E00044BD88A0DCA28420C440DDA27F00A43F5A
:1086F000BD8646BD95434F204E96C3C6CC5A26FD37
:108700004A26F8B6580039960A84034C978DB64825
:10871000198 40FC63C3DC300C3DD9ED39E7A008DF5
:1087200026F9DD9E39851027057A00C8201B96A4FE
:10873000442507B64816852027A7B64813840F247A
:108740006B64813BD8F7E97C8CC1120DDA2CE8718
:1087500056DFC48DB23FBD88A096C827037E8680B1
:10876000CC08049700D7A34F97A296A42B13C61842
:10877000BD8C03BD978B96A44424DA7COOA57E862D
:108780004E7E94518D148D5D8D20CE00B72056CE37
:108790000B78D518D148D02204BFC481ADD8A7F65
:1087A00089860197 88CE008839CC112483000186
:1087B00026FB39C615B648198540 2702CA02D701DB
:1087C00096BD8A4097BDB7500039B6481984 OF2727
:1087D00013F6481DC51027034A2709CE5000092665
:1087E000FD4A26F7398604F6481DC5102702860B78
:1087F000979CEC00DD88EC02DD8ABD8F83DD8C86E2
:10880000038BD8BC90CBD8BF35917BD8BE246BD8BB0
:10881000D57A008526EECC0C08D7089700CC07093E
:10882000DD89CC2A44DD8B866F978DCE8869DF8108
:108830009608CC019AD309DD0B0E8655979D8D1AAB
:108840007A009C26F5CE0089A600979D8D0C088C99
:10885000009C26F40F860897003 98608C6053E5A04
:1088600026FC78009D4A26F439D608C801D7085658
:1088700056D89D59494949840 49702CC019AD30B93
:10888000DD0B3B96BD847F200A96A285202610969C
:10889000BD8A80F658 00C50826059 7BDB750003937
```

```
:1088A000D6BDC4BFD7BDF750003996CEBD8F7E84EC
:1088B000089783CC0400D785CE00909ABDB75000AE
:1088C000CC14315A26FD9ABDB75000D685BD8F799C
:1088D000DA83F760003DD6024FBD8F7EE70087C4B
:1088E00000858C009D26E4D6BDCA04F75000C4FB69
:1088F000F7500039960273008B271C16988AD78A86
:10890000D8085476008344CC00B02403CC00BAD3FA
:108910000BDD0B7A008C3B7A008CD608C801D70897
:10892000369602169888AD78A44CC00E72403CC00F6
:10893000DDD30BDD0B3298024476008D3B0F8E00A9
:10894000FFCC0815DD00D703B740004F5FCE008392
:10895000E70088C00E326F897089702867E978048
:1089600053D7C1D7DFCE7A80F64818C5102603CE7C
:108970007900DFD5DFD7DFD3F64819BD8F7EC4037A
:10898000CA04D7108602971197E3FC480BDDABFCB5
:10899000480DDDADFC480FDDAFB6481197B1B648C4
:1089A0001E97B2B6481F4C97C3BD964BBD88AAC64A
:1089B0008409A600262B8C009226F6C680CE78006D
:1089C000A700A600261B088C80026F4CE7900DFC5
:1089D000D9DFDBBD8D6CB6481D840F8101270CC625
:1089E0007CBD8C038605BD861A20F9BD85EDC66C5D
:1089F000BD8C03B65800492A037E9B9CBD9A3C8ED1
:108A00000FFCE00836F00088C009E26F8CC05087E
:108A1000978CD70896C397BB96A2843F97A2CC00A9
:108A20008DDD86CE88F4DF81DC09C30014DD0B0EFA
:108A3000968C26FC8605978C9683169884D784D6C8
:108A40008873008927037E8AE14424095CC10226D9
:108A5000045F7C008CD788D68DC41FCE802A3AE66E
:108A60000C407860510409B9C1B81F025014F81A7
:108A7000C8250286C8979CD6BD8114250C969D26D4
:108A800068664979D979CCA80F74000BD8F2AF7A1
:108A90004001B65800492A037E893D960285022787
:108AA0009B6481D2B040F7E8DE3DC9E830001DD9B
:108AB0009E96A2240E7D00A32B0485102705DEC4FC
:108AC0000F6E0085212717588520270996BE260599
:108AD000CC08172407CC001525028608DD007E8A05
:108AE000304424095AC1FE26045F7A008CD788D608
:108AF00084968B2B0156CE802AC41F3AA600D6A29C
:108B0000C5402722C63CD79DD79CDE86D685C1703E
:108B100026022077C507260308DF865CD78598A242
:108B20004869007E8A30CE008E48BD8BF8CE802A00
:108B30004FD68EC807543AA900CE802AD68FC809CE
:108B4000543AA900CE802AD690C82A543AA900CE19
:108B5000802AD691C844543AA900CE802AD692C819
:108B60006F543AA900847FD6A2C43F810523068 1B1
:108B7000232504CA80CA40D7A2D6B6270B86175A27
:108B80002602861597 01D7B67E8A300F86368D3934
:108B90008D508D4159E80056D68459D784C453CEA0
:108BA000802A3AA600840781022F08DC838840C807
:108BB00013DD83968349498D3A7A008526D2BD8F8D
:108BC0008393 8C2603 7E8FB03F97 85CC008DDD8606
:108BD0004F5FDD8339D68359D783C465CE802A3A67
:108BE000E600DE8608 8C009C2603CE008EDF8656CB
:108BF000690039CE0088690569046903690269 0161
:108C0000690039CE8C123AEC00DDCAEC02DDCC7E74
:108C10008D1D501C390079373F37545C000071714D
```

```
:108C20003F000000507D5E065C743830777106545A
:108C30005877383877397F7F7F7F310737395E54EF
:108C40007900545871005B5458713107796D733E47
:108C5000507D5C38507D733E373E5C38373E795EE0
:108C6000796D735E39004F545871503839005E3059
:108C7000373E5E30507D5E3038717D5C50735C6392
:108C8000635C00396D000000396D5C7D00007C0084
:108C900050797700507939005079 6D5C50006D77CC
:108CA00050007D586D007D5839005831075E3931CC
:108CB0007795827335E3927337977736D00797DCB
:108CC0007773797D77733838773938387739 6D5ECF
:108CD0003E006D3F73006D7773006D776D007639E0
:108CE000500076396D00DC8E8D16D7D1168D11D7D8
:108CF000CFDC8EBD8F7E8D08D7D2168D03D7D039AD
:108D0000CE8D62C40F3AE60039CE00D25F8D449713
:108D1000CD8D4097CC8D3C97CBA60097CABD8DC614
:108D2000864097C9CE00C9C607D785A6005F4659B9
:108D300 0F76000CA02F76000C401F760007A00859E
:108D400026EB088C00CF26DF96CEBD8F7E8408B739
:108D500060003 9A60009813F27025C395D2701398F
:108D60004F393F065B4F666D7C077F6F8D0FDDE1EE
:108D7000BD81CADED99CDB271D387E85BE96BD84A9
:108D80008297BDB75000BD88898615 97034F5FDD78
:108D9000A297A4DDBE397F00CEDCB3D78EBD81B0F3
:108DA0002602840F978FDE8E2706BD8CE67E8D0906
:108DB000B648184724F496C226F0CC4040DDD18650
:108DC0003FDDCF7E8D09B648172A17B648142B12FF
:108DD000851026 0E96CE847FDED99CDB27028A8002
:108DE0097CE3996C397BBBD88897F400086089788
:108DF0000DCA284FD97A2C5082626853C2613DC4C
:108E0000A3C5082707BD8D7D8D8C20065625034DF3
:108E10002A0FBD87C0BD9A12BD87AABD8F187E8E4E
:108E2000B5B658002A2AC614BD8C03BD87AA86620F
:108E3000D602C5022606BD8D097E8ED5F658002BBA
:108E400007BD86F92BE820084A26E5BD8F2820DEDD
:108E5000BD87C0BD8D09D6A3C5082207F00CEBD25
:108E60008D09B648192A1596C127110CBD8368CC07
:108E70002A10DDB77F00A1C620BD8C03F64817BDC0
:108E80008F7E96A38408462608BD87AABD9A122025
:108E90002C36BD87B386149703BD87CA32818426DA
:108EA0005BD8784200E4D2A08BD8796BD9A1220E5
:108EB0006BD878ABD978BC615D701D703CC2A007C
:108EC000DDB7B6481 7BD8F7996A384104636BD8F9F
:108ED00018324D2608BD87AABD9A122022C614D783
:108EE00038188261EBD878FCC15009703D7A2D695
:108EF000A3C440D7A3860297A1BD978BBD8D09BDA2
:108F0000088A03F81082605BD878A20DCBD8796C6DC
:108F100015D703BD9A1220E48696D602C502260113
:108F2000394A26F68D0220F0D6BDDED59CD7260D17
:108F30007A00BC2602C4FD96C397BB2032C5022628
:108F400014B65800850426EF7A00BB2622CA028692
:108F5000 14 97BC201A96038508271496118520279C
:108F60000E9CD32603CE80000 9DFD5A6009713F709
:108F7000500096BD0556D7BD39050505 05390404D1
:108F8000040439CE00884F5F37A8009787444444D3
:108F90004498879787164F05050505D78605988657
```

```
:108FA0009786D887329886088C008C26DB43533905
:108FB00086089700B64818850827O5BD92552618DB
:108FC000BD90602714BD9067272BDC8AB3480D2520
:108FD0007FC480B938A241D3FD6B1C1EF2704D16B
:108FE0008A26F58D7B26F1D68BC1FF2708D1B025C7
:108FF000E7D1AF22E3B648148508276FDE888C2AB4
:109000001026128D6227098D572705BD91D1251A8B
:10901000BD888320158C2A0026518D4B27098D4051
:109020002705BD91D12503BD8889BD99047F00CE58
:109030008D3527108D2A270CCC0100DD88BD91A627
:109040000BD92B83FBD91C1852026 2BDC8ADDB9C118
:109050000FF27037E825F81FF27037E82C67E82E236
:10906000968A84F081E039DE8A0839688264AB6E5
:1090700048148504260 13FBD9904B648178440274B
:10908000 11BD9265250 5BD91D124077F481CBD9176
:10909000E13F96A285202706DE8A9CB327097F0040
:1090A000BE96BD8A0197BDBD92B8BD91DC86209762
:1090B000A2BD91C1BD91B020D581032626968926F7
:1090C00017BD92552612BD91C496A42B0CBD9904D0
:1090D000C61CBD8C037E84BB3FDCA9BD9341DDA9CA
:1090E0007E9451810E261DBD925126ECBD91C1BDCD
:1090F0009904D689BD851EDDCACC507DDDCCBD8DE1
:109100001D7E84BB81052625BD9251261FBD91DCA5
:10911000BD8D09BD9904BD91C496A446240E7C0062
:10912000A5BD9261240 37E864E7F00A43F81442624
:10913000033B648148502272BBD9904BD92A125188A
:109140000B648188510270C96DF2708BD92FEBD8D06
:109150001D200DBD92B88D4EB648162A03BD9289CA
:10916000BD91E13F8104260DBD925126F6BD91DCF3
:10917000BD8D99209E810126EAB64814850127E31A
:10918000BD9904BD92A12505BD92B88D19B64816AA
:10919000854027CFB648142B05BD928920C59689F6
:1091A0002BF7BD92953F96A28520262F8D2E8D11EF
:1091B000DE8A9CB32704867897B6DC8ADDB37E8D81
:1091C000997F00A496A284205FDDA27300B57E88FB
:1091D000AODC8A93AD2504DCAB938A39968997CEBF
:1091E00039B64816851027078D7B2564B648164783
:1091F000245E4725048DDA255796A38A0197A3BDDF
:10920000978BCE03E8BD85F0CC23007D0088261027
:10921000B648168508270796BE2703F6481C862001
:10922000DD8B6481685042 60AB658002BFBBD8695
:10923000F92BF696BD8A40B75000C614D703BD87F8
:10924000CACE0088BD87E58615970396BDB7500046
:109250003991B8260BDE8A9CB9260596A243851063
:109260003996A820029 6B2978E0C9689F64814C5B6
:109270010 2602847FF64817C5202606948E260104
:109280000D39948E988E26F839BD91D125D28DD581
:1092900026CE7E8883BD91D125C68DC925C27E8805
:1092A000890CB64817850227B78DBA25B37E91D1B0
:1092B000010 2040 810 2040 80B648188520273EDEB1
:1092C0008ABC780 2261BDC88B178002614F8780165
:1092D000272B8101260BB64814851026 04C47F274E
:1092E0001CCE78FC09A600A7048C780026F6DC8A40
:1092F000FD7802DC88FD7800CC0101DDE139DCDBA2
:1093000093D9271C3736388C017D27058CFFFD2625
:109310000139DEDBEC00938A2606A602918927F14B
```

```
:10932000DEDB8D11DFDBDC8AED009689A702DCDD58
:109330008D0FDDDD390808088C7A802603CE790090
:1093400039DD8E968F8B0119978F968E890019D6ED
:109350008F39C634BD8C03CC0200DDA2860897A4E9
:10936000CE9366DFC43FD6A07F00A4CE9376583A52
:10937000EE00863F6E0084DC94C7938C9526948320
:10938000946994AD93C393E093F681D7BD81B026E1
:109390005866D7E81D7C664BD8C03CE93B2DFC4D3
:1093A000CC0080DDA2CE04B0DF9E3FBD8D8DBD8D93
:1093B000963FCE93BDDFC6CC77407E828296A19742
:1093C000B120E8B648192AC97300C1270FC608BDE5
:1093D0008C03CE93AB20C77300DF26F1C60C20EFC1
:1093E000DCB3840F8309992605BD968B20BDBD9AF9
:1093F0002FBD96AD20B596C026104F4397CEC624FC
:10940000BD8C03860CB7600020C8C65CBD9C6CCECA
:1094100094142010DEA6DFB30DBD836EC628BD9C5C
:109420006CCE942BDFC64F5F7E94D9DEA626037EDA
:10943000 93ABDFB34F5FDDA6DDA9CC6385DDB786D7
:109440002897A1864097A47E8491BD9A52868097E2
:10945000A4DEA69CB327037E867BBD9A52C62CBD94
:109460009C6CDCA9DDB37E810FC638BD8C03CE9425
:10947000747E939ECE947CDFC67E8415D6CED7B202
:109480007E93ABC63CBD8C03CE948E7E939ED6AFAE
:109490000CE94A5DFC6BD851EDDCACC507DDDCCBD1A
:1094A0008D1D7E8221BD956897AF7E93ABC640BD72
:1094B0008C03CE94B87E939ED6B0CE94BF20D4BDFC
:1094C000956897B07E93ABC644BD8C03CE94D27E94
:1094D00093 9ECE951DDFC6DCABDDA68D66CC02006B
:1094E000DDA2860897A4CE94ECDFC43F96A0810A43
:1094F00026067300B57E846F8D013F96B527064F13
:109500005F97B5DDA6DCA6BD8F79DAA0D7A7BD81B0
:10951000B02604840F9A9D97A6D6A720268D35DE07
:10952000A6DFAB7E93ABC648BD8C03CE95317E9350
:109530009ECE953ADFC6DCAD209F8D18DEA6DFAD4E
:109540007E93ABD78EBD81B02602840F978FBD8CE2
:10955000E67E8D09DCA6B3480D2508FC480B93A6D2
:10956000250139865B7E81D796A1B148102506B1C9
:10957000480F220139864F7E81D754042733507615
:10958000665B3107775E545C273350526400CC40F1
:1095900000097CCD7A1D7A0D786D6A1C40FD787BDB7
:1095A0008F79DAA0BD851EDDCABD8D1D0E3E0FD69A
:1095B000A0C10B2705C10A26DE398E00FF7E93ABC2
:1095C00036CE957ABD8C06CE1770BD85F43297CD18
:1095D0008DBCDE8696A139860497A2CC06008DE06C
:1095E000816024F7DF92CC5B048DD5812424F7DFE2
:1095F0009481122506D695CA04D795F64818C54019
:109600002608D695CA08D795201442605CC020108
:109610000200A81132508DC948002C001DD94CC4F20
:10962000088D9D813224F74D27F4DF97CC660C8D91
:109630008F811324F74D27F4DF99CC6D108D81DFD6
:109640009B7F00968D05D7C27E84EE7F0085CE007D
:10965000090CC04F89ABDB75000D700C6315A26FD09
:10966000D685A600BD8F79F76000970286249ABD43
:10967000B7500084DFB7500087C00858C009D2621
:10968000DFC608D70096BDB7500039BD9A2FC60176
:109690008D41CE4800E6008D36E600BD8F7E8D2FD1
```

```
:1096A000088C482026EFBD9A2F8540273C7F00E09C
:1096B000C60C8D1F8D3396E32707CE800086218D43
:1096C0004F4F97E38D23CE9A9286348D43201AC450
:1096D0000FCA303CDED79CD32603CE800009DFD7EB
:1096E000E70038398DED1620EA8D007C00E0C60DCC
:1096F0008DE1C60A8DDDB648182A09CC0E0F8DE41F
:109700008607202 1CC05008DCA4A26FB860E20152F
:10971000E6008DBF084A26F83996C22706B64818D3
:1097200046250A8618C6208DAA4A26FB39BD88AA76
:10973000BD9886DC94C4F38DABC63A8D96DC928DD1
:10974000A3C63A8D8EDC908D9BC620969585082603
:10975000008C67085042602C661BD96D38D29DC97A4
:109760008D82C62DBD96D3DC998330305D27028B68
:10977000A4AC6033DCE9B373A86038D93C62DBD5C
:1097800096D3DC9BBD96E48603209ABD9A2FB648FB
:1097900014D6A3C501271B8520260139BD981FDCDF
:1097A0008ABD9824BD9719CE9B2EBD98A2BD99E481
:1097B000203785402711DCA35624058504260839 67
:1097C00096A28510270139B648158508260139 8DDE
:1097D0004EDCB98D4FBD9719BD989896A385042787
:1097E00022CE9AC68605BD9710BD96EBD6E0C13C49
:1097F000260AB6481585402703BD96AD96A384FA80
:10980000 97A33996A1810A27098124270BDCB97E09
:10981000 99FCD6B88D3E20D1D6B8BD98AC20CAFCF4
:10982000481A20128 1FF273CC1FF2744979084FOFB
:1098300081E0272096908D0FBD81B0260486209769
:10984000 90BD9A837E97879791D793BD8F7E97908F
:10985000D7922032D79EBD8F7ED7928D29CC475295
:10986000DD9020DDCC2041DD90CC4C4CDD9220D130
:10987000BD81B027EFCE464CDF90C654D79284OFFF
:109880008A30979320BBCE0090A600840F8A30A721
:10989000000088C009D26F239D6A186033D04CE9A9D
:1098A000CB3A8603BD97107E9787D689B648172ABC
:1098B0002AD78ECE0090CC20305C08A70076008E90
:1098C0002402E700C13826F1B648148510260486 24
:1098D000209798CE00 9186087E9710D796BD8F7EFO
:1098E000D7958DA2DC95813A25028B07C13A2502D6
:1098F000CB07DD95CC5354DD91CC5320DD93D79726 26
:10990000D79820CFBD9A2FB648152B0CD68AC1E028
:109910002406BD91D12401399688F64815812A265E
:109920007C52027F27E9 9B28144 2605C502263557
:10993000394D2607C50427DF7E99C7810 1274EC50B
:10994000 00827D4810E260EBD99D9BD99E4D689BDCC
:1099500098547E97E98105270E8103262BF648143B
:10996000C520261B398D0A8D708D79BD98AA7E97EA
:10997000E9B6481D85402706BD9265240138398D1A
:10998000588D61BD989820CA810427DB398DE2FC8F
:109990004814C50127E84D2ACE96892A0E8D3ACE65
:1099A0009B31BD98A2BD98AA7E97E98D2CCE9B34A1
:1099B00020F08D259689270ACE9ACBBD98A2DC8A05
:1099C000203ACE9ACE20F48DA88D0E8D17BD98AA80
:1099D000CC2A2ABD96E47E97E9DC8ABD9824BD98FE
:1099E0001F7E97195F9688CE988B3AA10027035C59
:1099F00020F5CE9B0D86033D3A7E98A2C1FF270F2E
:109A0000BD81B0270A16C4F0C1E02603BD98757E5B
```

```
:109A100097E98D1B8510260139BD981F8D0CBD97C8
:109A200019CE9B1OBD98A27E97E986077E9725F6F2
:109A3000481 8C50226023839B6481539BD96A6BD64
:109A4000981F8DE6BD9723CE9B22860CBD97107E76
:109A500097E98DDBBD981FDCB9BD9824BD971986A9
:109A60002A97A1BD9898DEA62606CE9B5B7E97E43A
:109A7000DCA98D0CC62FBD96D3DCA68D037E97E99D
:109A8000BD9847CE009086047E97100001440504DF
:109A90000E034F5249472020204445535420202094
:109AA000202054494D4520202020202020204441C2
:109AB00054452020202020204643 4E2020205 3A3
:109AC00054415455532046494C20534353343 2A
:109AD000455 24F5352415 3534347434347445443E2
:109AE000455443444D43454D4353504150414750E5
:109AF00041474341 4C4341 4C5544535 04F5 35041CF
:109B0000535341535243484D4F4E5 343485 0524 98B
:109B10005458204E53544 1C544353544347524 19C
:109B200 0434B2020202020204C4F47204F4E4143C4
:109B30004B5458535458454A414E46454 24D415 264
:109B40004150524D41594A554E4 554C415475343
:109B5000455 04F43544E4F5644454353544 1 5 2543D
:109B60008E00FF7F40004F5FDDCADDCC97CEBD8DFC
:109B700022C64CBD8C03861 4BD861AC614D703CEEC
:109B80008869DF81CC080C9708D700CC019AD309EB
:109B9000DD0B0E8655979DBD885A20F7B64818856F
:109BA0004260E866DBD860DB65800492BFA7E89B7
:109BB0003D7F0008B7400186 0 5BD861AC650BD8CA2
:109BC0003BD8D8DCC04FF97A2D7A00EB6580049D7
:109BD0002B037E893DD6A0C1FF27F10FC10B27DCE7
:109BE00096A42704DEC46E0096A32712C1012603A3
:109BF0007E9C9CC1032603 7E9D49863F200EC10AA0
:109C000026C27300A3C654BD8C0320B88E00FFBDCE
:109C10000860DBD9C6F20A5CE008E5F8640B750009C
:109C2000F7600086034A26FDB6580043A700BD9F93
:109C3000368639 4A26FD08CB108C009E26DDCE00E4
:109C40008ED693E8002B0A088C009E26F4867C2092
:109C5000BBCE008E5F96932A02C630D784A60084BE
:109C60003098842606088C009E26F239BD8C03CEDF
:109C700017707E85F4DC88B3480D250 8FC480B93EB
:109C8000882 501 39865 B2084968A270AB148102 5E9
:109C90006B1480220139864F7E9C0C861597032A
:109CA000BD9C17261186119703BD9C172608C65820
:109CB000BD8C037E9C12CE009DC602A6004848487B
:109CC00079008B79008A7900897900885A26F00911
:109CD0008C008D26E44F7900924979008F49978C4A
:109CE000C65C8D888D8FDC888D95438D82C660BD36
:109CF0009C68D94D68A8D42BD81B02610968B8443
:109D0000F8AE0B14811271486077E9C0CC664BDFB
:109D10009C6CD68BC40FC10A24EE8D1E968BBD8F12
:109D20007EB84819840F2705867F7E9C0CC670BDBF
:109D30009C6CD68C5C8D037E9BBCBD851EDDCA4FA2
:109D40005FDDCBD8D1D7E9C6FC65CBD9C6C4F5F86
:109D5000DDA6BD9543CE9D61DFC486FF97A47E9BA3
:109D6000C4C10A2705BD950520F4DCA6DD88BD9C8D
:109D700075C610BD8C03CE9D7E7F00A120DAC10A7E
:109D80002711D6A1BD8F79DAA0BD851EDDCABD8D94
```

:109D90001D20CB96A1978ABD9C88BD81B02611F667
:109DA0004811C40FD78BC674BD8C03CE9DE520C966
:109DB000C664BD8C03860F97A1F64811C40FBD85FC
:109DC0001E97CAC640D7CBCC3871DDCCBD8D1DCE19
:109DD0009DD57E9D58C10A27035F20ABD6A1C11037
:109DE0025C07E9D08C10A27035F209BD6A12704BA
:109DF000C1052505866D7E9C0C5AD78CF64819BD89
:109E0008F79DA8BD78BC678BD8C03CE9E117E9D61
:109E100058C10A27037E9BC4C668BD9C6C861597F3
:109E2000038D26861197038D20860297DFC615962F
:109E3000932A02C614D703378D2633C4FBD7038D6C
:109E40001F7A00DF26E77E9C9CBD9C17260D96920C
:109E500098932B07968F98932B0139867C7E9C0CC8
:109E60007F0084CE008B86049786E6005686108D90
:109E70002A5686208D2596844C81102614D68C86F1
:109E8000197845686308D13860497845686302039
:109E9000A97847A008626D40920CB373C9783869C
:109EA0003978596932B3224298D7786489A83B71A
:109EB005000C6115A26FD8648B750008D72CE005C
:109EC000E80926FD8D78270E7A008526DC866F7ED0
:109ED0009C0C8D6A27F738333925418D458649B763
:109EE00050003D86499A83B75000C60A5A26FD8421
:109EF000F7B75000C6615A26FD8A08B75000C6065B
:109F0005A26FD8649B750003D8D25CE03590926B6
:109F1000FD8D2B26C17A008526C120B18D2026AD6E
:109F200020B48648B75000D684BD8F79F7600039D9
:109F30008608B750003D4FB75000B76000398640E3
:109F40008DE2C6035A26FDF658008DEA96838130CD
:089F50002703D58339C58039D0
:109FF000893D893D0080893D80B689FF9B60893D10
:0000000000

APPENDIX II

The following is a memory dump the computer program
for the mobile unit MC3870 according to the invention.

S11B00001A2805D6B0B1B65128008A2806A36A715C6F735D67F75D7239
S11B00185D445C290120534E1E05A052348117E391052069900542 53D7
S11B00302064B7411851715438011D1B1CE381074253206D9003206FCE
S11B0048B742E152C24519C55538011D1B1C4213C05221655B10718A56
S11B006050451F252694032018550B71F0CCCC5C70191C705254775A76
S11B00782017552038541CA51450A4122170E005701C545A41217013A3
S11200090EEB4785041151FB5E0B5E0B570B51C5E
S11B00A01A2806A3C7748102B5587351280575 28056D8463A6846028FS
S11B00B805DA46121 58131A1910A1313810E676A4C900320FFO77FF5F2
S11B00D022E006202A0420100528060C202A04700528057128060C02B2
S11B00E814230E942A2806DF6B6774F6FC9420745C71F6840B04208096
S11B01005128 05EA28060C72F6840C28057171042805E828060C2805BA
S11B011871B5B67F512805636568A05C78EC21081212F7506A7CFCC02C
S11B01305EA15C461391054C12135C67684D504C51280-DF4ECC709468

```
S11B014806C771810240222EB6685CB672FC656A9408C1840578F69406
S11B016006517DFCC15C4CB4706F605C635C625D8FF9076B20175D717E
S11B01785C7458775AB71B903263C04C198203CC5C4E8FF862694B12AC
S11B0190EB142101507EFB8407230E840330304CC09108251481032044
S11B01A8145C4DCC20F68202135C70C881FD745802E550450671368170
S11B01C03AE4028402125B7156F084083718E7940573810031316 50E5
S11B01D86C84A7623C77FE4C94091F252694042902E35C0B00E050C011
S11B01F04C19CC5C626990B090B9F0840AC75772E79405775 58636896
S11B02082007ED5B1016504D23095B1016C0504D232A5B1016C0504D73
S11B02202344 5B1016C0504C236F5B1016C013250A82062544820518D9
S11B0238047707626F3C4C668431211F94440313941CCC840B3E9404A5
S11B02502904D94ECE940F6568A0504DE0159145A15BEC9451626A7FE0
S11B0268CC654C91032202B49087654EEC5EB0703E9402743E94053E00
S11B02809402786A18FC5C90DD6874FC6ECE94D6A01381042904A97011
S11B0298CECC94CAA0131381C52904ED1A401581072805D6B0B1B628F3
S11B02B006A3290120504B5CF084AB1A2806DF461391171FB94E3C65E
S11B02C881171 31391064021F8840E471381042904ED656A7CFC1F5C1F
S11B02E029013B1A2800733 4 3428006150280056E0C3C35321535B1091
S11B02F8778A2502820943231353 4223405242135BCB626D4C19820340
S11B0310CC5C4E8FF83494D228059C44ED94C245EC94BE2806A34C58F2
S11B032862682020ED5B21BF504D51044D064E077054C89404C084265F
S11B03407FF522E0EC940734674C629007425A28054C436B5A28054C2E
S11B035859C8840D70C49481C094FC765029051C656A4615815F7AE0CA
S11B0370945 6C1847E2110840AF74C84032201210D5C7FF1844D1581B7
S11B03880B4C220C5D20235D5D7F5C6F74F1840D70C44C940322015EA2
S11B03A04C22015D411F210284 68F112151F665C6A5D6C4C52705D5D12
S11B03B8685EC28455654C22045C6A7DFC904A7EE041844475E0940A7E
S11B03D078F7844128008A903972E0944074E1841775E1846C7EE19413
S11B03E83646158114674C0590667CFC5C9070C681702805E89059C6D6
S11B040081686E4C22045DB071FC5C90677168675C2040FB8454730404
S11B04187995903C73E0944AC910D666C70CC84412805E139904524E4
S11B04307A84771F84E11F84C71F84D31F84CF78F6842741247F8405DF
S11B04481F941F72693990C047158116 28007F7F51280575280 60C4CD0
S11B0460B570B6C9840429012029013B6A3C91FA6F7F5C7651280566D0
S11B04785250715320145151 20C01F94F37CFC2211B478E050B5461386
S11B04909106A121019454A013910F391DF3294E03381DD28056390E1
S11B04A8B91A656E4C22405CB02806A35820155C68725CB55128057540
S11B04C0666E3C84582805C42805E878F7840428007F041458715990C6
S11B04D8841A2806A35159CE94E0CE9444CC942190832902A91A280657
S11B04F0A3C6813E2805D66872B55C2805E874F724025C7F51280 56378
S11B05082301843228 05C4A01215811E6C3E4C05204490B72805E1C131
S11B052084136D5C6840 5CB56D3C6F7F9403705D5C29013B656E75FCA6
S11B05385CB02901202805E1654C22045C471391F22902DA4AEC841361
S11B0550344A220FEC840C4A22F0EC840620FFEC94D01C7290032010D2
S11B0568527458900C20109002705B705120125 27060656A7CFCC2B46E
S11B0580A014F884042904A9C1940AA0FB9405A691E7551C3094E4315A
S11B059894E1701C62687054554DE453121212 51E5544314E355155229
S11B05B013E5554114E2E4540A251494E54418544518551CA72103501E
S11B05C8451413240651C13081FD666F5C1C6768705C656A705C6E5D70
S11B05E05C666F705D8FFE1C7051656E4C2220B0A1504EB046C6709289
S11B05F80E40910C125 02020F64094031212C1666B5D051C1A76B562B2
S11B0611 68005D015D025D035C08451221781F51280575280 59C445D79
S11B0628455C280073626D134C198203CC5C4E8FF87019502800612817
S11B064000563494E962682A020220555D5D5D778E168FFB5E654C500F
S11B06586A4C22125162687 5527853543494FE411851EC14131413E011
```

```
S11B0670B0A014F884042904A9201C3294E675524CCC195CDB20193331
S11B068894DA785341B4DB0A1F0B2526201594CC666870C74C81032242
S11B06A004B50C66684E5960705D8FFE691FC9B573F084054C13135E88
S11B06B84DA414125171F1C78203C7574619C65676F112EC5C401F5007
S11B06D01594DB49B5676C425D435D465D475C676C4D064D074D564EC9
S11B06E85766701C284329204259204D4F544F524F4C412031393831DE
S11B07000001010201020283010202830283838401020283028383B429
S11B0718028383848384848501020203020303B4020303840384848579
S11B07300203038403848485038484858485858601020203020303B459
S11B0748020303840384848502030384038484850384848584858586B9
S11B0760020303040304048503040485048585860304048504858586A9
S11B0778048585868586868701020203020303840203084038484B509
S11B0779002030384038484850384848584858586020303040304048F1
S11B07A803040485048585860304048504858586048585868586868741
S11B07C00203030403040485030404850485858603040485048585B639
S11B07D8048585868586868703040405040505860405058605B6B6B789
S11307F0040505B60585B6B670586B6B7B6B7B7B815
S9030000FC
```

What is claimed is:

1. In a register modelled comnunications system communicating data between a primary station and a plurality of register modelled remote stations, each register modelled remote station having a predetermined station address and adapted to transceive data signals including at least a command data packet containing at least an operation code, an argument and a remote station address, said register modelled remote stations each comprising:

first register means for storing a remote station address;

generating means for generating a command data packet containing at least an operation code, an argument and said remote station address;

means for transmitting said generated command packet to the primary station;

means for receiving a command data packet from the primary station;

second register means for receiving the operation code and argument of said received command data packet;

means for executing the operation code from said received command data packet in cooperation with said argument.

2. The register modelled remote station according to claim 1, further including means for automatically acknowledging receipt of a command data packet from the primary station.

3. The register modelled remote station according to claim 1, further including means for automatically retransmitting said generated command data packet upon failure to receive an acknowledge command data packet from the primary station.

4. The register modelled remote station according to claim 1, further said generating means includes means for appending a predetermined bit synachronization portion and a predetermined synchronization word to each generated command data packet.

5. The register modelled remote station according to claim 1, further said generating means further includes means for generating a code word having a predetermined number of bits and appends the generated code word to each generated command data packet.

6. The register modelled remote station according to claim 5, further said generating means further includes convolution encoding means for encoding each generated command data packet and appended code word according to a predetermined convolution code.

7. The register modelled remote station according to claim 1, wherein said receiving means further includes bandpass filtering means and limiting means coupled in series for filtering and limiting each command data packet received from the primary station.

8. The register modelled remote station according to claim 1, further including a plurality of registers, said executing means further including means responsive to the operation code from said received command data packet for addressing one of said registers.

9. The register modelled remote station according to claim 1, wherein said receiving means further includes a plurality of status switches and third register means having a plurality of bits, each bit of the third register means corresponding to one of said status switches and indicating whether the corresponding status switch is on or off.

* * * * *